(12) United States Patent
Kagawa

(10) Patent No.: US 12,469,108 B2
(45) Date of Patent: Nov. 11, 2025

(54) ENDOSCOPE SYSTEM AND PROCESSOR UNIT PERFORMING DIRECTION-BASED IMAGE PROCESSING

(71) Applicant: OLYMPUS MEDICAL SYSTEMS CORP., Tokyo (JP)

(72) Inventor: Hiroaki Kagawa, Sagamihara (JP)

(73) Assignee: Olympus Medical Systems Corp., Tokyo (JP)

( * ) Notice: Subject to any disclaimer, the term of this patent is extended or adjusted under 35 U.S.C. 154(b) by 497 days.

(21) Appl. No.: 17/971,363

(22) Filed: Oct. 21, 2022

(65) Prior Publication Data

US 2023/0125742 A1 Apr. 27, 2023

Related U.S. Application Data

(60) Provisional application No. 63/270,588, filed on Oct. 22, 2021.

(51) Int. Cl.
*A61B 1/00* (2006.01)
*A61B 1/05* (2006.01)
(Continued)

(52) U.S. Cl.
CPC .......... *G06T 3/60* (2013.01); *A61B 1/000095* (2022.02); *A61B 1/00016* (2013.01);
(Continued)

(58) Field of Classification Search
CPC ........ A61B 1/000095; A61B 1/000097; A61B 1/00016; A61B 1/0005; A61B 1/00193;
(Continued)

(56) References Cited

U.S. PATENT DOCUMENTS 6,636,254 B1 * 10/2003 Onishi ...................... G06T 3/60
348/65
8,187,167 B2 * 5/2012 Kim ...................... A61B 1/3132
600/117
(Continued)

FOREIGN PATENT DOCUMENTS

JP 2008-517703 A 5/2008
WO 2006/046809 A1 5/2006

*Primary Examiner* — John P Leubecker
(74) *Attorney, Agent, or Firm* — Morgan, Lewis & Bockius LLP

(57) ABSTRACT

An endoscope system includes an endoscope, at least one monitor, a first measuring instrument configured to measure a first direction, at least one second measuring instrument configured to measure a second direction, a reception circuit configured to receive the image from the endoscope, and a processor. The first direction corresponds to a horizontal component of an imaging direction of the endoscope. The second direction corresponds to a horizontal component of a reference direction. The reference direction is a direction in which the at least one monitor faces or is a direction toward or away from an image display surface of the at least one monitor. The processor is configured to calculate an angle between the first direction and the second direction, process the image based on the angle, and display the processed image on the at least one monitor. The processing includes a rotation processing or a horizontal flip processing.

15 Claims, 30 Drawing Sheets

(51) Int. Cl.
*A61B 90/00* (2016.01)
*G06T 3/60* (2006.01)

(52) U.S. Cl.
CPC ........ *A61B 1/0005* (2013.01); *A61B 1/00097* (2022.02); *A61B 1/00193* (2013.01); *A61B 1/05* (2013.01); *A61B 2090/067* (2016.02); *A61B 2090/368* (2016.02)

(58) Field of Classification Search
CPC . A61B 1/05; A61B 1/00045; A61B 2090/067; A61B 2090/368; G06T 3/60
See application file for complete search history.

(56) References Cited

U.S. PATENT DOCUMENTS

| | | | |
|---|---|---|---|
| 2013/0063580 A1* | 3/2013 | Ogawa | G06F 3/012 348/65 |
| 2014/0343404 A1* | 11/2014 | Razzaque | A61B 8/0841 600/424 |
| 2019/0159860 A1* | 5/2019 | Teranuma | A61B 1/05 |
| 2019/0183321 A1* | 6/2019 | Teranuma | H04N 23/555 |
| 2019/0282063 A1* | 9/2019 | Kado | G16H 30/40 |
| 2020/0014853 A1* | 1/2020 | Blanquart | A61B 1/000095 |
| 2020/0046208 A1* | 2/2020 | Kasai | A61B 1/3132 |
| 2020/0110956 A1* | 4/2020 | Fan | H04N 21/42204 |
| 2020/0306003 A1* | 10/2020 | Katsuki | G02B 21/242 |

\* cited by examiner

ENDOSCOPE SYSTEM AND PROCESSOR UNIT PERFORMING DIRECTION-BASED IMAGE PROCESSING

RELATED APPLICATION DATA

This application is based on and claims priority under 35 U.S.C. § 119 to U.S. Provisional Application No. 63/270,588 filed on Oct. 22, 2021, the entire contents of which are incorporated herein by reference.

FIELD OF THE DISCLOSURE

The present disclosure relates to an endoscope system and a processor unit.

BACKGROUND

In a surgical operation using an endoscope, the endoscope is inserted into the body of a patient and acquires an image of an organ or the like. An operator and an assistant perform a surgical operation while observing the image acquired by the endoscope. The operator and the assistant manipulate treatment tools while checking the states of the treatment tools seen in the image.

The operator and the assistant stand at different positions and face different directions. Therefore, a plurality of monitors are disposed in an operation room. Each of the monitors displays an image acquired by the endoscope.

There is a case in which the direction of the endoscope and the direction of the visual line of the operator or the assistant are greatly different from each other. In such a case, the direction of a treatment tool seen in an image is greatly different from that of the treatment tool actually viewed by the operator or the assistant. Since the moving direction of a treatment tool recognized by the operator or the assistant is greatly different from that of the treatment tool in an image displayed on each monitor, the operator or the assistant needs to be accustomed to manipulations.

Published Japanese Translation No. 2008-517703 of the PCT International Publication discloses a method of matching the direction of an organ for an operator or an assistant to the direction of the organ in an image. In the method, the operator or the assistant issues a rotation request by manipulating a manipulation unit. A monitor rotates based on the rotation request, or an image rotates based on the rotation request.

Patent Literature 1: Published Japanese Translation No. 2008-517703 of the PCT International Publication

SUMMARY

According to a first aspect of the present disclosure, an endoscope system includes an endoscope configured to acquire an image of a subject, at least one monitor, a first measuring instrument configured to measure a first direction. The first direction corresponds to a horizontal component of an imaging direction of the endoscope. The endoscope system includes at least one second measuring instrument configured to measure a second direction. The second direction corresponds to a horizontal component of a reference direction. The reference direction is a direction in which the at least one monitor faces or is a direction toward or away from an image display surface of the at least one monitor. The endoscope system includes a reception circuit configured to receive the image from the endoscope and a processor. The processor calculates an angle between the first direction and the second direction. The processor processes the image based on the angle, wherein the processing includes a rotation processing or a horizontal flip processing. The processor displays the processed image on the at least one monitor.

According to a second aspect of the present disclosure, the second measuring instrument may be disposed on the monitor. The reference direction is the direction in which the at least one monitor faces.

According to a third aspect of the present disclosure, in the first aspect, the second measuring instrument is disposed on a body of the user. The reference direction is the direction toward the image display surface of the at least one monitor.

According to a fourth aspect of the present disclosure, in the first aspect, the endoscope system may further comprise a treatment tool. A third direction corresponds to a horizontal component of a reference direction of the treatment tool. The at least one second measuring instrument is further configured to measure the third direction by using an image that contains the treatment tool.

According to a fifth aspect of the present disclosure, in the first aspect, the second measuring instrument measures the second direction using an image that contains the at least one monitor.

According to a sixth aspect of the present disclosure, in the first aspect, the processor may display a value of the angle on the monitor.

According to a seventh aspect of the present disclosure, in the first aspect, the processor may display an icon on the monitor, where the icon has an orientation that corresponds to the angle.

According to an eighth aspect of the present disclosure, in the first aspect, the endoscope may acquire the image at a predetermined frame rate. The processor may calculate the angle at a lower rate than the frame rate.

According to a ninth aspect of the present disclosure, in the first aspect, the endoscope system may further comprise a sensor that measures a depression angle between the imaging direction and a horizontal plane. The processor may correct distortion of the image, which is generated in accordance with a distance between the endoscope and a subject, by using the depression angle.

According to a tenth aspect of the present disclosure, in the first aspect, the endoscope includes an image sensor in which a plurality of pixels are disposed in a matrix shape. An effective vertical pixel number of the image sensor is greater than a vertical pixel number of the image displayed on the at least one monitor.

According to an eleventh aspect of the present disclosure, in the first aspect, the endoscope system may further comprise a sensor that measures a depression angle between the imaging direction and a horizontal plane. When the depression angle is larger than a preset angle, the processor performs the rotation processing on the image based on the angle.

According to a twelfth aspect of the present disclosure, in the first aspect, a sensor may measure a depression angle between the imaging direction and a horizontal plane. When the depression angle is smaller than a preset first angle and the angle between the first direction and the second direction is larger than a preset second angle, the processor performs the horizontal flip processing on the image.

According to a thirteenth aspect of the present disclosure, in the first aspect, the image of the subject may include a left image and a right image used for displaying a stereoscopic image. The processing may include replacing the left image and the right image with each other.

According to a fourteenth aspect of the present disclosure, a processor unit includes a reception circuit connected using a wireless or a wired connection to an endoscope, and a processor. The endoscope acquires an image of a subject in a living body and the reception circuit receives the image from the endoscope. The processor calculates an angle between a first direction and a second direction, where the first direction corresponds to a horizontal component of an imaging direction of the endoscope and the second direction corresponds to a horizontal component of a reference direction, where the reference direction is a direction in which a monitor faces or is a direction in which a user faces a monitor. The processor processes the image based on the angle. The processing includes a rotation processing or a horizontal flip processing. The processer displays the processed image on the monitor.

According to a fourteenth aspect of the present disclosure, an image rotation method performed by a processor. The image rotation method includes calculating an angle between a first direction and a second direction, processing an image acquired by the endoscope based on the angle, wherein the processing includes rotation processing or horizontal flip processing; and displaying the processed image on the monitor.

The first direction corresponds to a horizontal component of an imaging direction of an endoscope and the second direction corresponds to a horizontal component of a reference direction, where the reference direction is a direction in which a monitor faces or is a direction in which a user faces a monitor.

DETAILED DESCRIPTION

Hereinafter, embodiments of the present disclosure will be described with reference to the drawings.

First Embodiment

Figure 1:
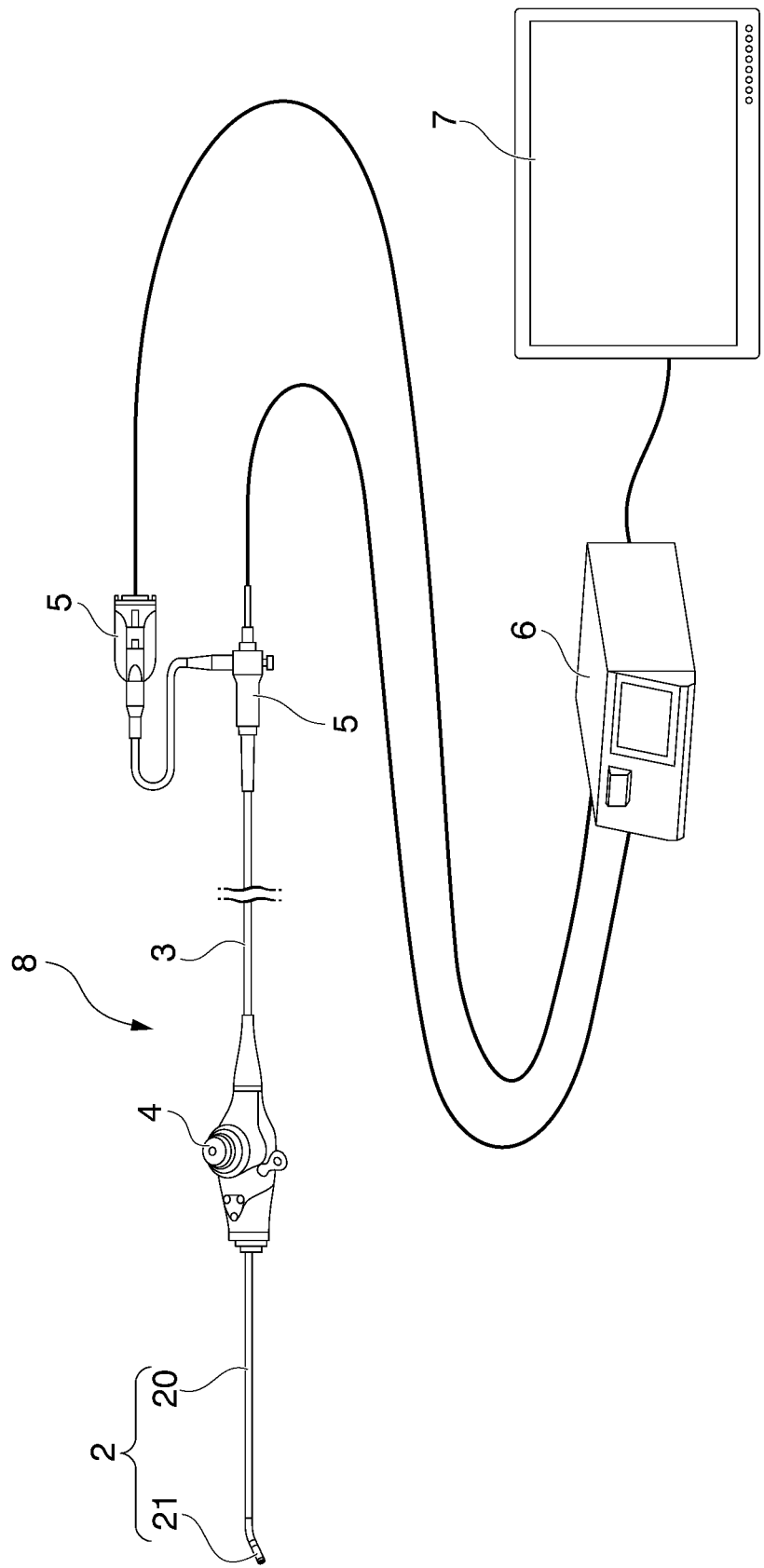
FIG. 1 is a schematic diagram showing a configuration of an endoscope system according to a first embodiment of the present disclosure.

A first embodiment of the present disclosure will be described. FIG. 1 shows a schematic configuration of an endoscope system 1 according to the first embodiment of the present disclosure. The endoscope system 1 shown in FIG. 1 includes an endoscope insertion unit 2, a universal code 3, a manipulation unit 4, a connector unit 5, a processor unit 6, and a monitor 7. The endoscope insertion unit 2, the universal code 3, the manipulation unit 4, and the connector unit 5 constitute a scope 8 (endoscope).

The endoscope insertion unit 2 includes an insertion unit 20 and an imaging unit 21. The insertion unit 20 is inserted into a living body, which is a subject. The imaging unit 21 is disposed at the distal end of the insertion unit 20 and generates a video signal by imaging the inside of the subject. The manipulation unit 4 is connected to the end of the insertion unit 20, which is opposite the imaging unit 21. The manipulation unit 4 accepts various manipulations for the endoscope insertion unit 2 from a user.

The universal code 3 connects the endoscope insertion unit 2 and the connector unit 5. The video signal generated by the imaging unit 21 is output to the connector unit 5 via a transmission cable (not shown in the drawing) inserted through the insertion unit 20, the manipulation unit 4, and the universal code 3.

The connector unit 5 performs predetermined processing on the video signal output from the imaging unit 21. The connector unit 5 is connected to the processor unit 6 and outputs the video signal to the processor unit 6.

The processor unit 6 performs image processing on the video signal output from the connector unit 5. Furthermore, the processor unit 6 centrally controls the entire endoscope system 1.

The monitor 7 is a liquid crystal display (LCD) or the like. The monitor 7 displays a video based on the video signal processed by the processor unit 6. In addition, the monitor 7 displays various kinds of information related to the endoscope system 1. As described later, a plurality of monitors are used as the monitor 7.

Figure 2:
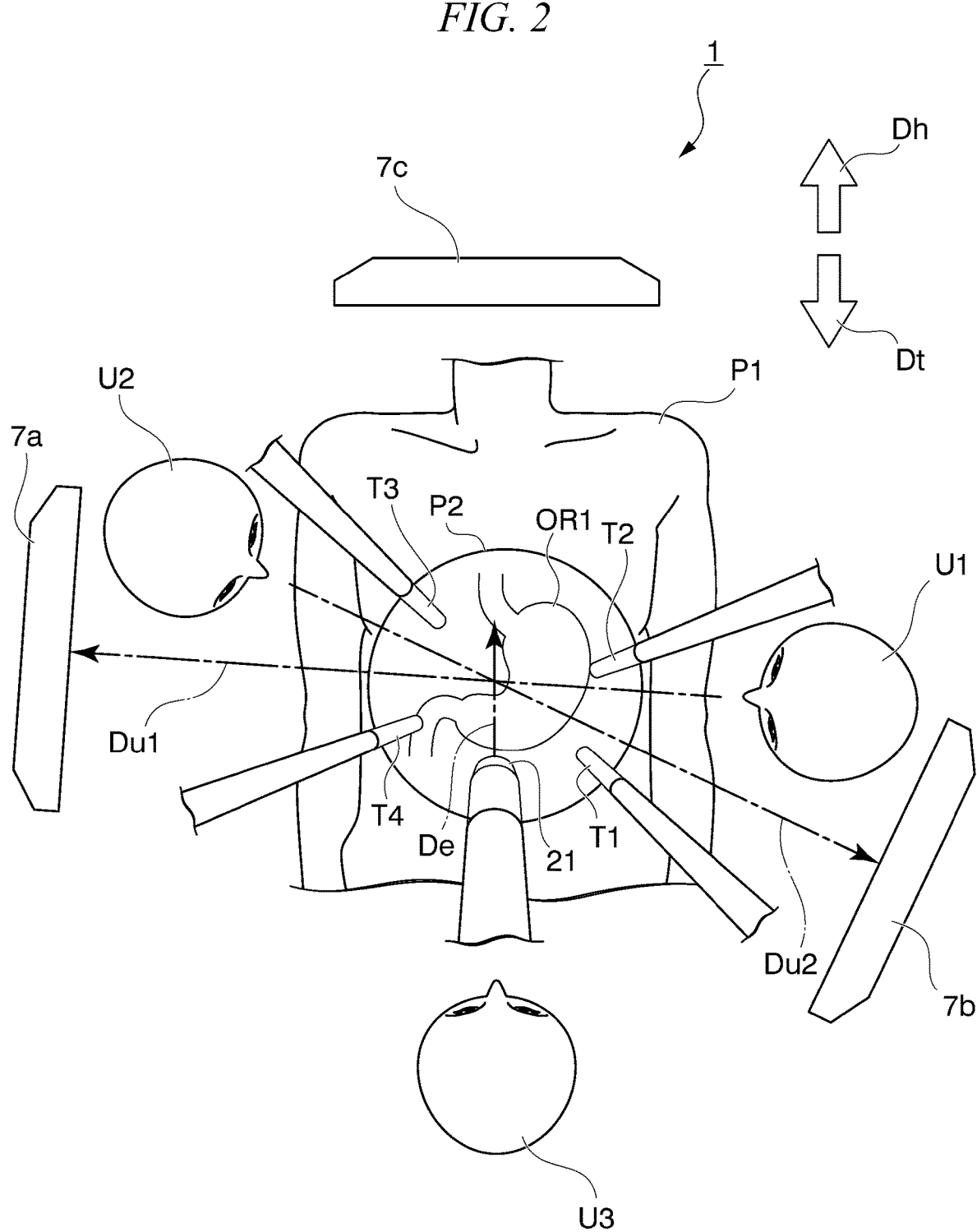
FIG. 2 is a schematic diagram showing a layout of the endoscope system according to the first embodiment of the present disclosure.

FIG. 2 schematically shows a layout of the endoscope system 1 in an operation room. Each configuration overlooked in a direction vertical to the ground is shown in FIG. 2. A direction used for descriptions of FIG. 2 indicates a horizontal direction that is parallel to the horizontal plane.

Three users are around a patient P1. The three users are an operator U1, an assistant U2, and a scopist U3. The operator U1, the assistant U2, and the scopist U3 are at different positions. The operator U1 and the assistant U2 face each other. The patient P1 is lying between the operator U1 and the assistant U2. For example, the operator U1 is on the left side of the patient P1, and the assistant U2 is on the right side of the patient P1. The operator U1 may be on the right side of the patient P1, and the assistant U2 may be on the left side of the patient P1.

The endoscope insertion unit 2 and treatment tools T1 to T4 are inserted into an inside P2 of the body cavity of the patient P1 through a trocar (not shown in the drawing). The operator U1 manipulates a treatment tool T1 and a treatment tool T2. The assistant U2 manipulates a treatment tool T3 and a treatment tool T4. The operator U1 and the assistant U2 perform treatment on an organ OR1 of the patient P1 by manipulating each treatment tool. The scopist U3 holds the manipulation unit 4. The imaging unit 21 of the endoscope insertion unit 2 is shown in FIG. 2.

A monitor 7a, a monitor 7b, and a monitor 7c corresponding to the monitor 7 are disposed. The monitor 7a is a main monitor, and the monitor 7b and the monitor 7c are sub monitors. The screen of the monitor 7a faces the operator U1. The screen of the monitor 7b faces the assistant U2. The screen of the monitor 7c faces the scopist U3. The monitor 7a facing the scopist U3 does not need to be disposed, and the scopist U3 may observe an image displayed on the monitor 7b facing the operator U1 or the monitor 7c facing the assistant U2.

An imaging direction De of the imaging unit 21, a visual line direction Du1 of the operator U1, and a visual line direction Du2 of the assistant U2 are shown in FIG. 2. Each of the imaging direction De, the visual line direction Du1, and the visual line direction Du2 indicates a horizontal component that is parallel to the horizontal plane. The visual line direction Du1 is greatly different from the imaging direction De, and the visual line direction Du2 is greatly different from the imaging direction De.

A direction Dh and a direction Dt are shown in FIG. 2. The direction Dh and the direction Dt indicate a direction of the patient P1. The direction Dh indicates a direction from the center of the trunk of the patient P1 toward the head of the patient P1. The direction Dt indicates a direction opposite to the direction Dh. Each of the directions Dh and Dt in FIG. 2 indicates a horizontal component that is parallel to the horizontal plane. For example, the imaging direction De is almost the same as the direction Dh. The direction Dh seen from the operator U1 is the right direction, and the direction Dt seen from the operator U1 is the left direction. The direction Dh seen from the assistant U2 is the left direction, and the direction Dt seen from the assistant U2 is the right direction.

Figure 3:
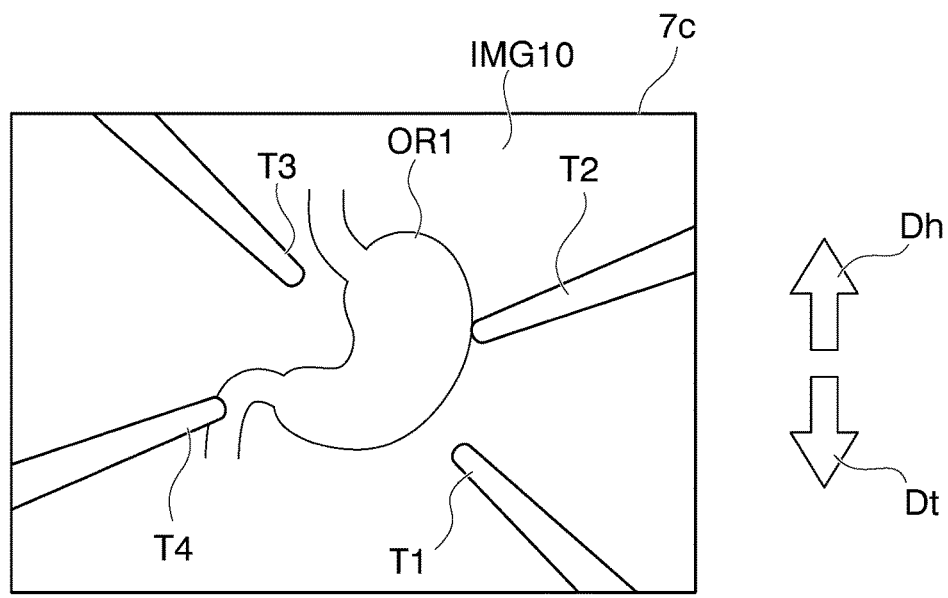
FIG. 3 is a diagram showing an example of an image displayed on a monitor in the first embodiment of the present disclosure.

FIG. 3 shows an example of an image displayed on the monitor 7c. The monitor 7c displays an image IMG10. The organ OR1, the treatment tool T1, the treatment tool T2, the treatment tool T3, and the treatment tool T4 are seen in the image IMG10. Since the imaging direction De shown in FIG. 2 is almost the same as the direction Dh, the upward direction in the image IMG10 is almost the same as the direction Dh and the downward direction in the image IMG10 is almost the same as the direction Dt.

In a case in which the monitor 7a displays the same image as the image IMG10, the actual direction Dh seen from the operator U1 is the right direction and the direction Dh in an image displayed on the monitor 7a observed by the operator U1 is the upward direction. In a case in which the monitor 7b displays the same image as the image IMG10, the actual direction Dh seen from the assistant U2 is the left direction and the direction Dh in an image displayed on the monitor 7b observed by the assistant U2 is the upward direction. Since the actual direction Dh seen from the operator U1 or the assistant U2 is different from the direction Dh in an image displayed on the monitor 7a or the monitor 7b, the operator U1 or the assistant U2 needs to correct the direction of each treatment tool in their heads.

In the first embodiment, the endoscope system 1 rotates an image in accordance with an angle between the imaging direction of the imaging unit 21 and the direction of each monitor. Processing of rotating an image acquired by the imaging unit 21 will be described by using FIGS. 4 to 6.

Figure 4:
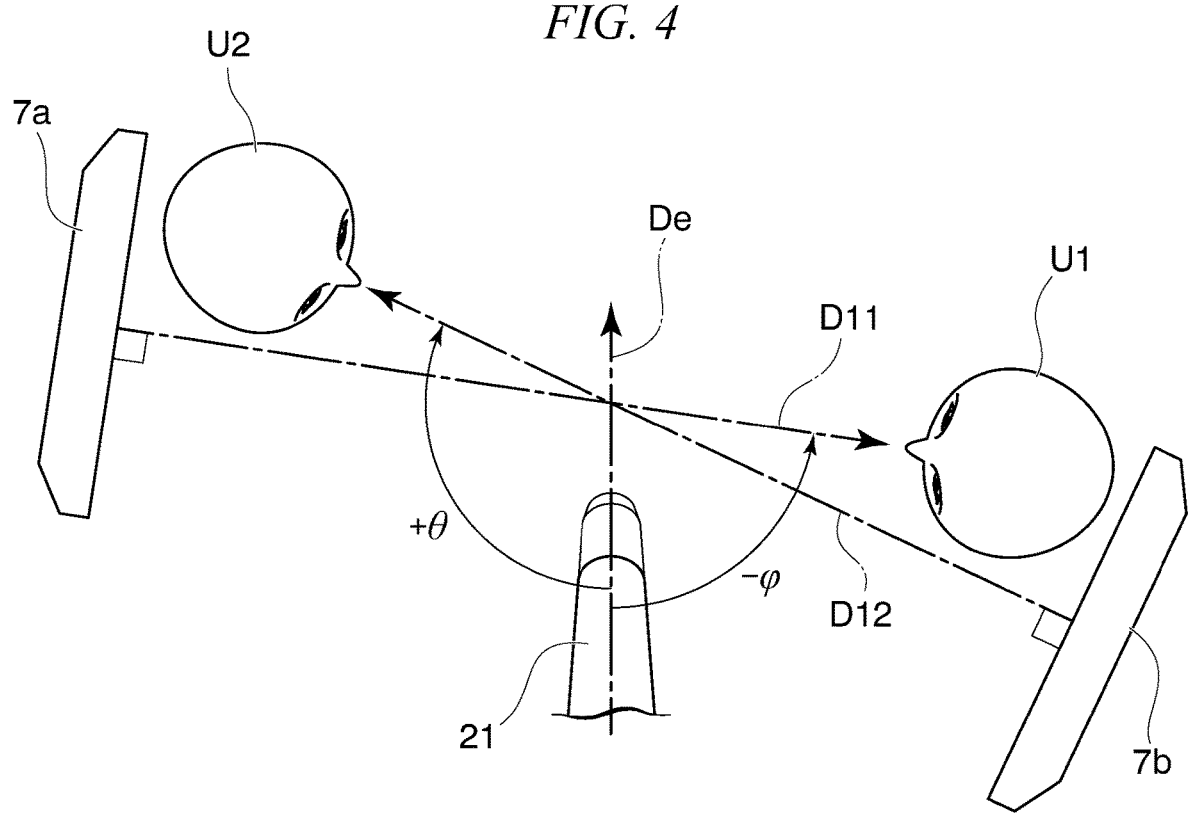
FIG. 4 is a diagram showing an example of a positional relationship between an endoscope, a monitor, an operator, and an assistant in the first embodiment of the present disclosure.

FIG. 4 shows an example of a positional relationship between the imaging unit 21, the monitor 7a, the monitor 7b, the operator U1, and the assistant U2. An imaging direction De, a direction D11, and a direction D12 are shown in FIG. 4. The direction D11 indicates a horizontal component of a reference direction indicating a direction in which the monitor 7a faces. For example, the reference direction of the monitor 7a is a direction perpendicular to the screen of the monitor 7a. The direction D12 indicates a horizontal component of a reference direction indicating a direction in which the monitor 7b faces. For example, the reference direction of the monitor 7b is a direction perpendicular to the screen of the monitor 7b.

The endoscope system 1 calculates an angle $\varphi$ between the imaging direction De and the direction D11 and calculates an angle $\theta$ between the imaging direction De and the direction D12. The angle $\varphi$ and the angle $\theta$ are expressed as a value of −180 degrees or more and 180 degrees or less. A positive direction of the angle $\varphi$ and the angle $\theta$ is a clockwise direction, and a negative direction of the angle $\varphi$ and the angle $\theta$ is a counterclockwise direction. The endoscope system 1 rotates an image acquired by the imaging unit 21 by the angle +$\varphi$ so as to correct the image. The endoscope system 1 displays the corrected image on the monitor 7a. In addition, the endoscope system 1 rotates an image acquired by the imaging unit 21 by the angle −$\theta$ so as to correct the image. The endoscope system 1 displays the corrected image on the monitor 7b.

Figure 5:
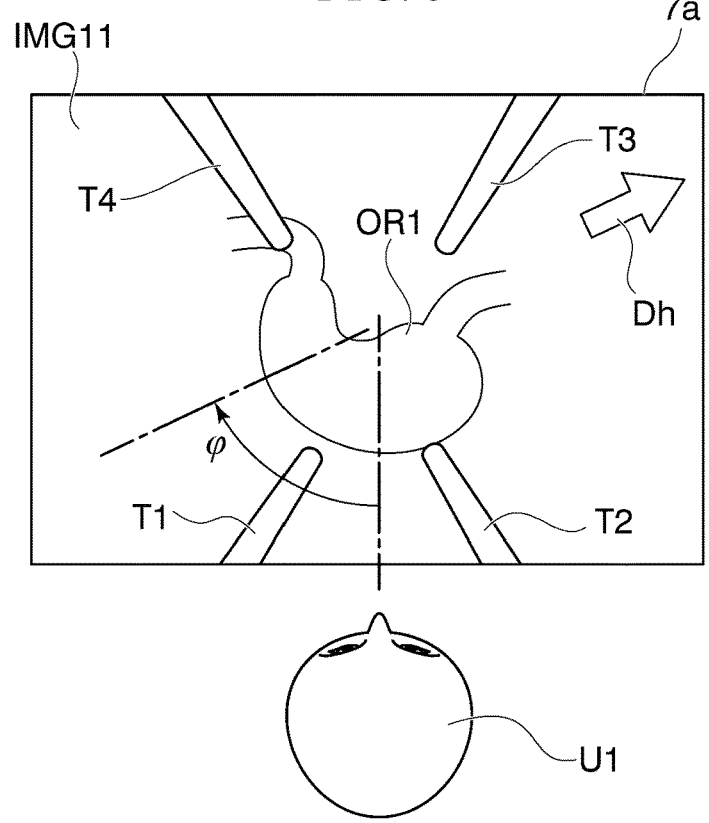
FIG. 5 is a diagram showing an example of an image displayed on the monitor in the first embodiment of the present disclosure.

FIG. 5 shows an example of an image displayed on the monitor 7a. The monitor 7a displays an image IMG11. The visual line direction of the operator U1 is a direction opposite to the direction D11 shown in FIG. 4, and is obtained by rotating the imaging direction De counterclockwise by the angle $\varphi$. The endoscope system 1 rotates an image acquired by the imaging unit 21 clockwise by the angle $\varphi$ so as to obtain the image IMG11.

The actual direction Dh seen from the operator U1 is the right direction, and the direction Dh in the image IMG11 is a direction close to the right direction. Since the actual direction of the patient P1 seen from the operator U1 almost matches the direction of the patient P1 in the image IMG11, the operator U1 does not need to correct the direction of each treatment tool in his/her head. Therefore, the operator U1 can intuitively manipulate each treatment tool.

Figure 6:
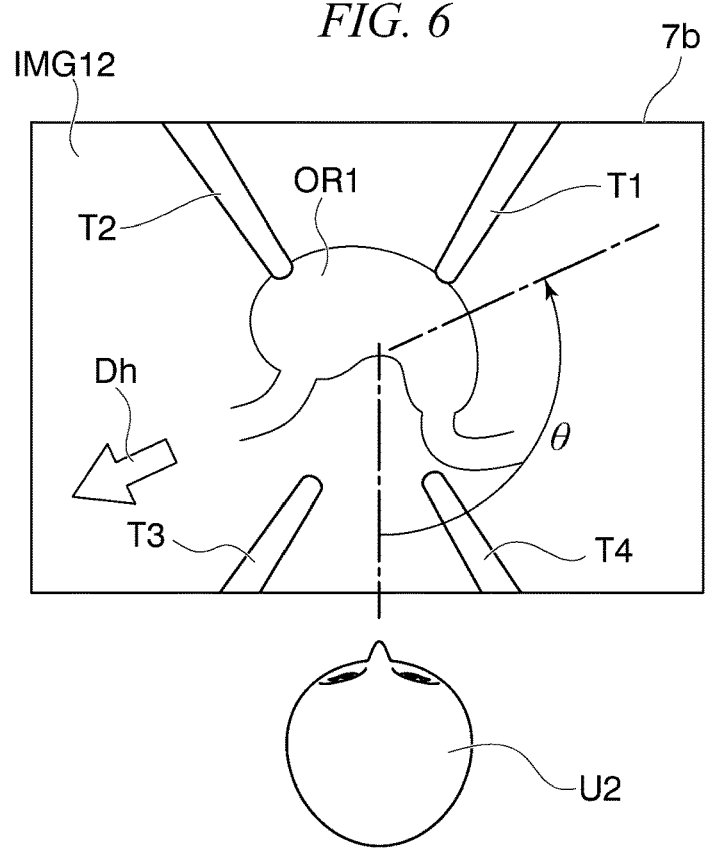
FIG. 6 is a diagram showing an example of an image displayed on the monitor in the first embodiment of the present disclosure.

FIG. 6 shows an example of an image displayed on the monitor 7b. The monitor 7b displays an image IMG12. The visual line direction of the assistant U2 is a direction opposite to the direction D12 shown in FIG. 4, and is obtained by rotating the imaging direction De clockwise by the angle $\theta$. The endoscope system 1 rotates an image acquired by the imaging unit 21 counterclockwise by the angle $\theta$ so as to obtain the image IMG12.

The actual direction Dh seen from the assistant U2 is the left direction, and the direction Dh in the image IMG12 is a direction close to the left direction. Since the actual direction of the patient P1 seen from the assistant U2 almost matches the direction of the patient P1 in the image IMG12, the assistant U2 does not need to correct the direction of each treatment tool in his/her head. Therefore, the assistant U2 can intuitively manipulate each treatment tool. For example, when the operator U1 instructs the assistant U2 to pull the treatment tool T3, the assistant U2 can intuitively understand that he/she should pull the left hand.

Figure 7:
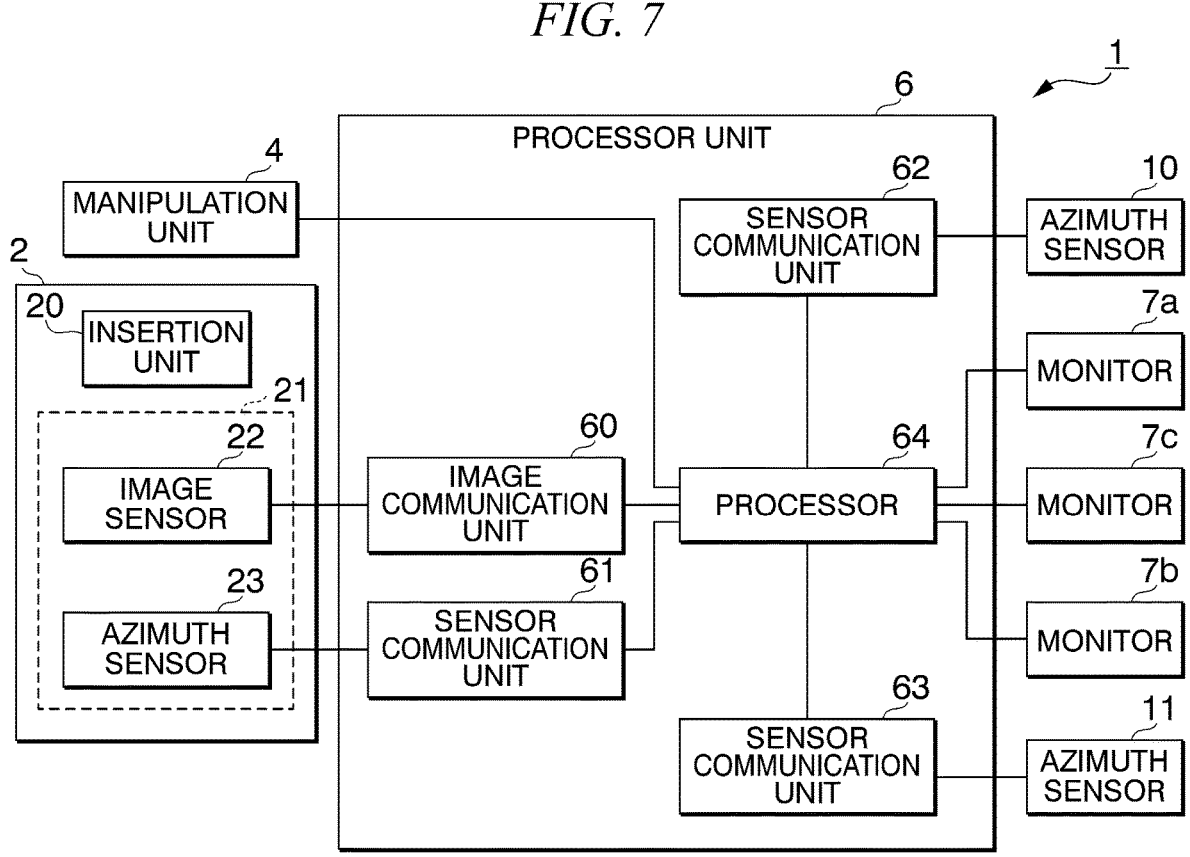
FIG. 7 is a block diagram showing a configuration of the endoscope system according to the first embodiment of the present disclosure.

A configuration of the endoscope system 1 will be described in detail. FIG. 7 shows the configuration of the endoscope system 1. The endoscope system 1 includes an azimuth sensor 10 and an azimuth sensor 11 in addition to the endoscope insertion unit 2, the manipulation unit 4, the processor unit 6, the monitor 7a, the monitor 7b, and the monitor 7c. The insertion unit 20 and the imaging unit 21 of the endoscope insertion unit 2 are shown in FIG. 7. The universal code 3 and the connector unit 5 shown in FIG. 1 are not shown in FIG. 7.

The imaging unit 21 includes an image sensor 22 and an azimuth sensor 23. The processor unit 6 includes an image communication unit 60, a sensor communication unit 61, a sensor communication unit 62, a sensor communication unit 63, and a processor 64.

A schematic function of the endoscope system 1 will be described. The imaging unit 21 acquires an image of a subject inside a living body. For example, the subject is the organ OR1 shown in FIG. 2. The azimuth sensor 23 (first measuring instrument) measures a first direction indicating a horizontal component of the imaging direction of the imaging unit 21. The azimuth sensor 10 (second measuring instrument) measures a second direction indicating a horizontal component of the reference direction of the monitor 7a, and the azimuth sensor 11 (second measuring instrument) measures a second direction indicating a horizontal component of the reference direction of the monitor 7b.

The image communication unit 60 (reception circuit) receives an image from the imaging unit 21. The processor 64 calculates an angle between the first direction and each of the two second directions. The processor 64 performs rotation processing on the image received from the imaging unit 21 based on each of the calculated angles. The processor 64 displays the images on which the rotation processing has been performed on the monitor 7a and the monitor 7b.

The function of the endoscope system 1 will be described in detail. The imaging unit 21 includes an imaging optical system not shown in FIG. 7. The imaging optical system includes a lens. The imaging optical system may be separated from the imaging unit 21, and the imaging optical system may be mounted on the distal endo of the imaging unit 21.

The image sensor 22 and the azimuth sensor 23 are disposed inside the imaging unit 21. The image sensor 22 is a complementary metal-oxide-semiconductor (CMOS) sensor or the like. The image sensor 22 includes a plurality of pixels disposed in a matrix shape and generates an image at a predetermined frame rate.

The azimuth sensor 23 is a geomagnetic sensor or the like. The azimuth sensor 23 may be disposed inside the image sensor 22. The azimuth sensor 23 measures the imaging direction of the imaging unit 21 and generates imaging direction information indicating the measured imaging direction. The imaging direction corresponds to the first direction. For example, the imaging direction is parallel to the optical axis of the imaging optical system included in the imaging unit 21. The imaging direction may be perpendicular to an imaging plane included in the image sensor 22.

For example, the imaging direction information indicates a three-dimensional imaging direction of the imaging unit 21. The processor 64 can calculate a horizontal component of the imaging direction by using the imaging direction information. Therefore, the imaging direction information includes information indicating the horizontal component of the imaging direction.

The processor 64 can calculate a depression angle of the imaging direction by using the imaging direction information. The depression angle indicates an angle between the imaging direction and the horizontal plane.

Figure 8:
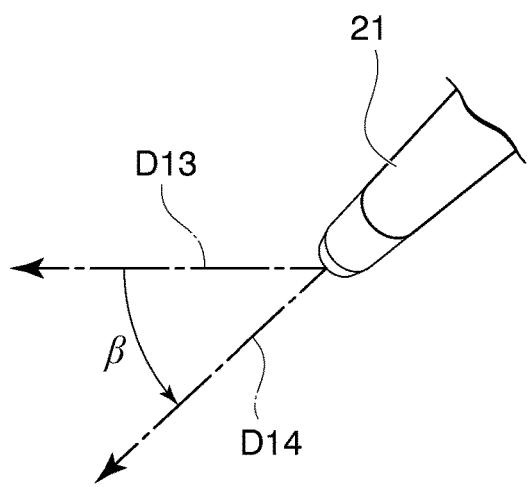
FIG. 8 is a diagram showing a depression angle of an imaging direction in the first embodiment of the present disclosure.

FIG. 8 shows the depression angle of the imaging direction. FIG. 8 shows the state of the imaging unit 21 in a plane perpendicular to the horizontal plane. A direction D13, a direction D14, and an angle β are shown in FIG. 8. The direction D13 indicates a horizontal direction that is parallel to the horizontal plane. The direction D14 indicates the imaging direction. The angle β indicates an angle between the direction D13 and the direction D14. The angle β corresponds to the depression angle of the imaging direction. The depression angle is expressed as a value of 0 degrees or more and 90 degrees or less. The imaging direction information includes depression angle information indicating the depression angle.

The azimuth sensor 10 and the azimuth sensor 11 are geomagnetic sensors or the like. For example, the azimuth sensor 10 is disposed on the surface of the monitor 7a, and the azimuth sensor 11 is disposed on the surface of the monitor 7b. The azimuth sensor 10 may be disposed inside the monitor 7a. The azimuth sensor 11 may be disposed inside the monitor 7b.

The azimuth sensor 10 measures the reference direction of the monitor 7a and generates monitor direction information indicating the measured reference direction. The azimuth sensor 11 measures the reference direction of the monitor 7b and generates monitor direction information indicating the measured reference direction.

For example, the monitor direction information indicates a three-dimensional reference direction of the monitor 7a or the monitor 7b. The processor 64 can calculate a horizontal component of the reference direction by using the monitor direction information. Therefore, the monitor direction information includes information indicating the horizontal component of the reference direction. The reference direction of the monitor 7a and the reference direction of the monitor 7b correspond to the second direction.

The image communication unit 60 includes a communication circuit and is connected to the image sensor 22 by using wireless or wired connection. The image communication unit 60 performs communication with the image sensor 22 and receives an image from the image sensor 22. The image communication unit 60 outputs the received image to the processor 64.

The sensor communication unit 61 includes a communication circuit and is connected to the azimuth sensor 23 by using wireless or wired connection. The sensor communication unit 61 performs communication with the azimuth sensor 23 and receives the imaging direction information from the azimuth sensor 23. The sensor communication unit 61 outputs the received imaging direction information to the processor 64.

The sensor communication unit 62 includes a communication circuit and is connected to the azimuth sensor 10 by using wireless or wired connection. The sensor communication unit 62 performs communication with the azimuth sensor 10 and receives the monitor direction information related to the monitor 7a from the azimuth sensor 10. The sensor communication unit 62 outputs the received monitor direction information to the processor 64.

The sensor communication unit 63 includes a communication circuit and is connected to the azimuth sensor 11 by using wireless or wired connection. The sensor communication unit 63 performs communication with the azimuth sensor 11 and receives the monitor direction information related to the monitor 7b from the azimuth sensor 11. The sensor communication unit 63 outputs the received monitor direction information to the processor 64.

For example, the processor 64 may be constituted by at least one of a central processing unit (CPU), a digital signal processor (DSP), and a graphics-processing unit (GPU). The processor 64 may be constituted by a logic circuit such as an application-specific integrated circuit (ASIC) or a field-programmable gate array (FPGA). The processor 64 may include one or a plurality of processors. The processor 64 may include one or a plurality of logic circuits.

The processor 64 may read a program and execute the read program. The program includes commands defining the operations of the processor 64. In other words, the functions of the processor 64 may be realized by software. The program may be transmitted from a computer storing the program to the endoscope system 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

The processor 64 calculates a horizontal component of the imaging direction based on the imaging direction information. The processor 64 calculates a horizontal component of the reference direction of the monitor 7a based on the monitor direction information related to the monitor 7a. The processor 64 calculates a horizontal component of the reference direction of the monitor 7b based on the monitor direction information related to the monitor 7b.

The processor 64 calculates an angle between the horizontal component of the imaging direction and the horizontal component of the reference direction of the monitor 7a so as to calculate the angle φ shown in FIG. 4. The processor 64 calculates an angle between the horizontal component of the imaging direction and the horizontal component of the reference direction of the monitor 7b so as to calculate the angle θ shown in FIG. 4. The processor 64 performs the rotation processing on an image received from the imaging unit 21 based on the angle φ or the angle θ. The processor 64 outputs the image on which the rotation processing has been performed to the monitor 7a or the monitor 7b.

The endoscope system 1 may include a camera instead of the azimuth sensor 23, the azimuth sensor 10, and the azimuth sensor 11. For example, the camera is disposed on the ceiling of the operation room. The camera generates an image in which the insertion unit 20, the monitor 7a, and the monitor 7b are seen. The processor 64 may calculate the imaging direction of the imaging unit 21, the reference direction of the monitor 7a, and the reference direction of the monitor 7b by analyzing the image.

In the above-described example, the processor 64 functions as a first measuring instrument that measures a first direction indicating a horizontal component of the imaging direction of the imaging unit 21. In the above-described example, the processor 64 functions as a second measuring instrument that measures a second direction indicating a horizontal component of the reference direction of the monitor 7a or the monitor 7b.

In a case in which the insertion unit 20 is capable of bending in a predetermined direction, the processor 64 may calculate a bending direction of the insertion unit 20. The processor 64 may calculate a direction of the insertion unit 20 outside the body of the patient P1 by analyzing an image generated by the above-described camera. The processor 64 may calculate an imaging direction of the imaging unit 21 based on the calculated direction and the bending direction of the insertion unit 20. In this example, the endoscope system 1 does not need to include the azimuth sensor 23. In this example, the processor 64 functions as a first measuring instrument that measures a first direction indicating a horizontal component of the imaging direction of the imaging unit 21.

The azimuth sensor 23 may be disposed inside the manipulation unit 4. The azimuth sensor 23 disposed inside the manipulation unit 4 may measure an imaging direction of the imaging unit 21 and may generate imaging direction information. In a case in which the insertion unit 20 is capable of bending in a predetermined direction, the processor 64 may calculate a bending direction of the insertion unit 20 based on a manipulation state of a bending manipulation unit (not shown in the drawing) installed in the manipulation unit 4.

Figure 9:
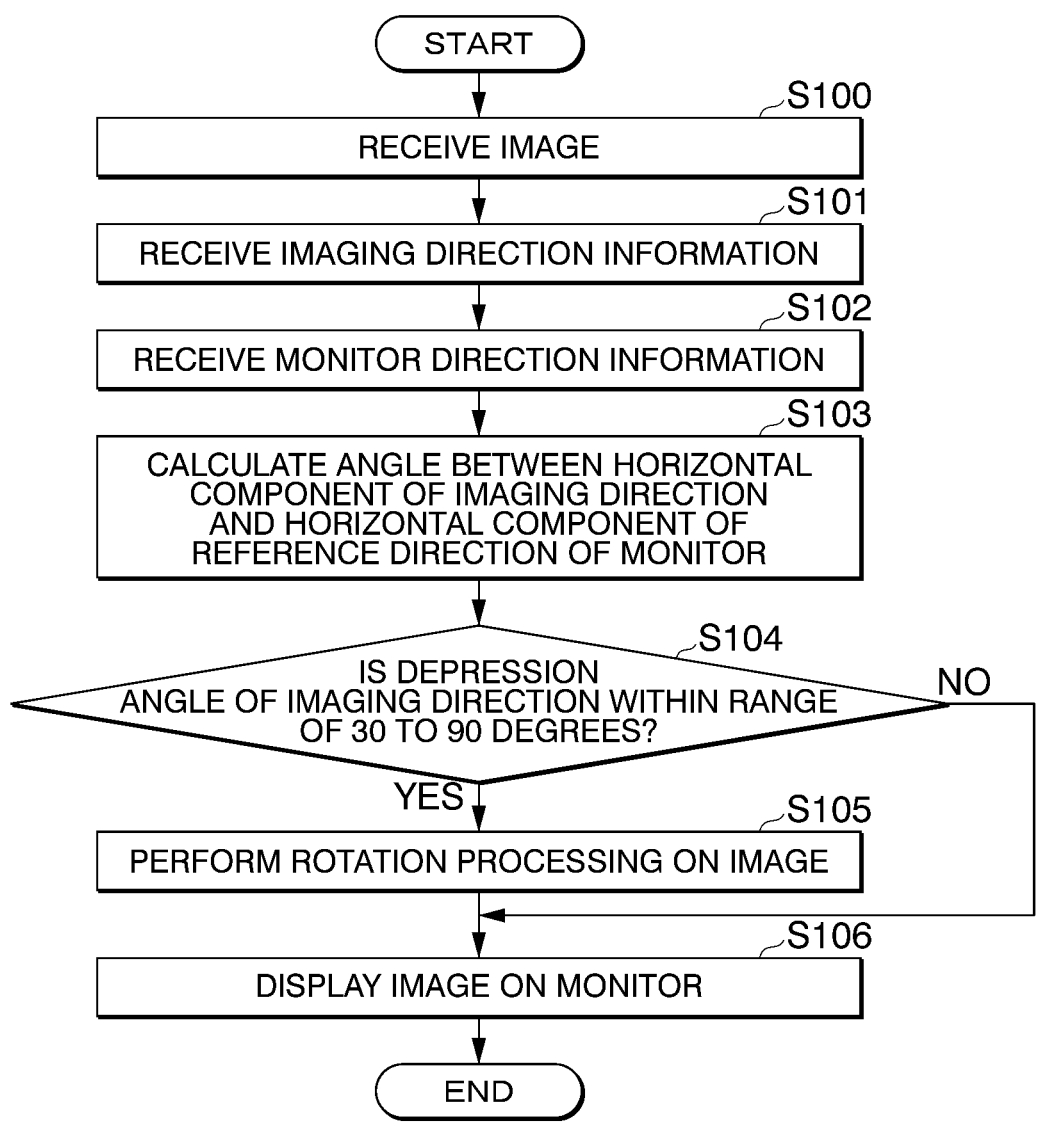
FIG. 9 is a flow chart showing a procedure of an operation of a processor unit in the first embodiment of the present disclosure.

An operation of the processor unit 6 will be described in detail by using FIG. 9. FIG. 9 shows a procedure of the operation of the processor unit 6.

The image communication unit 60 receives an image output from the image sensor 22 (Step S100).

After Step S100, the sensor communication unit 61 receives the imaging direction information output from the azimuth sensor 23 (Step S101).

After Step S101, the sensor communication unit 62 receives the monitor direction information output from the azimuth sensor 10, and the sensor communication unit 63 receives the monitor direction information output from the azimuth sensor 11 (Step S102). The monitor direction information output from the azimuth sensor 10 and the monitor direction information output from the azimuth sensor 11 are not necessarily received at the same time.

The order in which Steps S100 to S102 are executed is not limited to that shown in FIG. 8. Steps S100 to S102 may be executed in any order.

Steps S100 to S102 may be executed at different frequencies. For example, Step S101 or Step S102 may be executed less frequently than Step S100. The frequency at which Step S102 is executed may be different from that at which Step S101 is executed.

After Step S102, the processor 64 calculates an angle −φ between the horizontal component of the imaging direction and the horizontal component of the reference direction of the monitor 7a. In addition, the processor 64 calculates an angle +θ between the horizontal component of the imaging direction and the horizontal component of the reference direction of the monitor 7b (Step S103).

After Step S103, the processor 64 calculates a depression angle between the imaging direction and the horizontal plane by using the imaging direction information. The processor 64 determines whether the depression angle of the imaging direction is within a range of 30 to 90 degrees (Step S104).

The depression angle of the imaging direction is expressed as a value of 0 degrees or more and 90 degrees or less. When the depression angle of the imaging direction is less than 30 degrees, the imaging unit 21 acquires an image of a subject seen in a direction close to the horizontal direction. In this case, the processor 64 determines that the depression angle of the imaging direction is not within the range of 30 to 90 degrees and executes Step S106 described later. The rotation processing is not performed on the image acquired by the imaging unit 21.

The above-described 30 degrees are an example of a threshold value used for determining the size of the depression angle. The threshold value is not limited to 30 degrees. The threshold value may be 45 degrees or the like.

When the depression angle of the imaging direction is 30 degrees or more and 90 degrees or less, the imaging unit 21 acquires an image of the subject seen below the horizontal direction. In this case, the processor 64 determines that the depression angle of the imaging direction is within the range of 30 to 90 degrees and performs the rotation processing on the image received in Step S100. At this time, the processor 64 rotates the received image by the angle +φ so as to correct the image and rotates the received image by the angle −θ so as to correct the image (Step S105).

After Step S105, the processor 64 outputs the image that has been corrected based on the angle −φ to the monitor 7a and outputs the image that has been corrected based on the angle +θ to the monitor 7b. Each of the monitors 7a and 7b displays the corrected image (Step S106).

Steps S100 to S106 are repeatedly executed. The processor 64 calculates an angle φ and an angle θ at the same rate as the frame rate of the image sensor 22. The frequency at which the processor 64 calculates the angle φ and the angle θ may be different from that at which the image sensor 22 generates an image. For example, the processor 64 may calculate the angle φ and the angle θ at a lower rate than the frame rate. The rate at which the angle φ and the angle θ are calculated may be integer times as large as the frame rate. The integer is two or more.

The processor 64 performs the rotation processing at the same rate as the frame rate. The processor 64 may calculate the angle φ and the angle θ at a lower rate than that of the rotation processing. For example, Step S103 and Step S105 may be executed in a first frame period, and Step S105 may be executed in a second frame period following the first frame period without Step S103 being executed. The processor 64 may repeat the processing in the first frame period and the processing in the second frame period. The processor 64 may perform the rotation processing in Step S105 in the second frame period by using the angle calculated in Step S103 in the first frame period.

The processor 64 may perform rotation processing described below. Two or more ranges related to the angle $\varphi$ and the angle $\theta$ are prepared in advance. For example, a first range, a second range, a third range, and a fourth range are prepared. The first range indicates an angle of 0 degrees or more and less than 45 degrees. The second range indicates an angle of 45 degrees or more and less than 90 degrees. The third range indicates an angle of 90 degrees or more and less than 135 degrees. The fourth range indicates an angle of 135 degrees or more and less than 180 degrees.

Hereinafter, processing related to the angle $\varphi$ will be described. Processing related to the angle $\theta$ is similar to the following processing. The processor 64 determines which range the angle $\varphi$ is included in. When the angle $\varphi$ is included in the first range, the processor 64 does not perform the rotation processing on the image acquired by the imaging unit 21. When the angle $\varphi$ is included in the second range, the processor 64 rotates the image acquired by the imaging unit 21 by 45 degrees. When the angle $\varphi$ is included in the third range, the processor 64 rotates the image acquired by the imaging unit 21 by 90 degrees. When the angle $\varphi$ is included in the fourth range, the processor 64 rotates the image acquired by the imaging unit 21 by 135 degrees.

The processor 64 may display information indicating the angle $\varphi$ or the angle $\theta$ on the monitor 7a or the monitor 7b.

Figure 10:
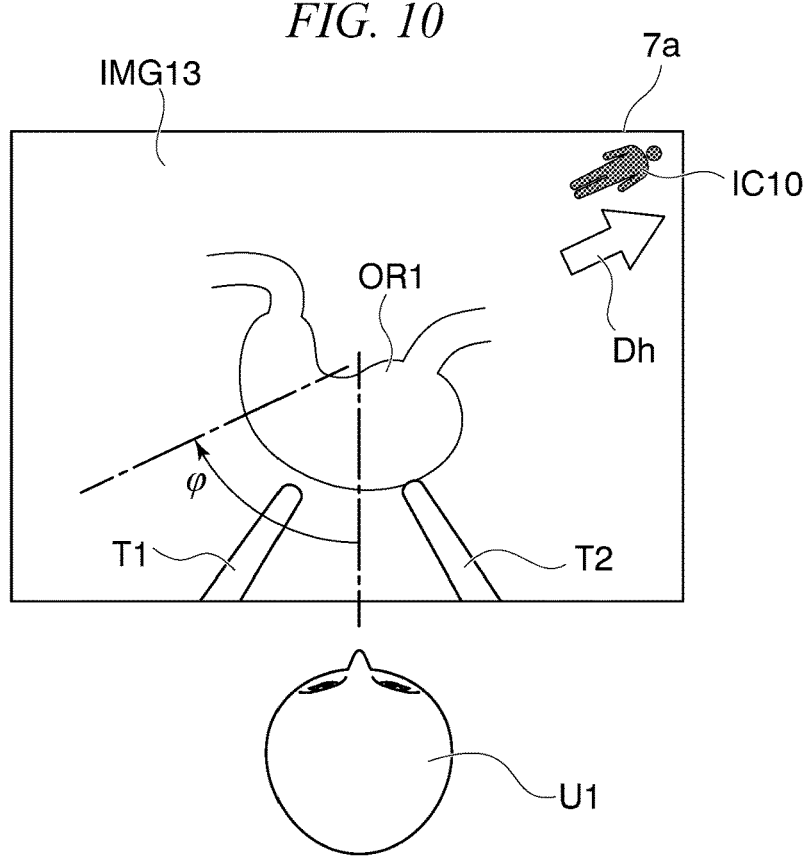
FIG. 10 is a diagram showing an example of an image displayed on the monitor in the first embodiment of the present disclosure.

FIG. 10 shows another example of an image displayed on the monitor 7a. The monitor 7a displays an image IMG13. Differences between the image IMG13 and the image IMG11 shown in FIG. 5 will be described. The processor 64 superimposes information indicating the angle $\varphi$ on the image IMG13. In the example shown in FIG. 10, an icon IC10 similar to a shape of a human is displayed on the image IMG13. The icon IC10 is tilted in accordance with the angle $\varphi$. The direction of the head indicated by the icon IC10 is the same as the direction Dh in the image IMG13. The operator U1 can recognize a rotation direction and a rotation amount of the image IMG13 displayed on the monitor 7a.

Figure 11:
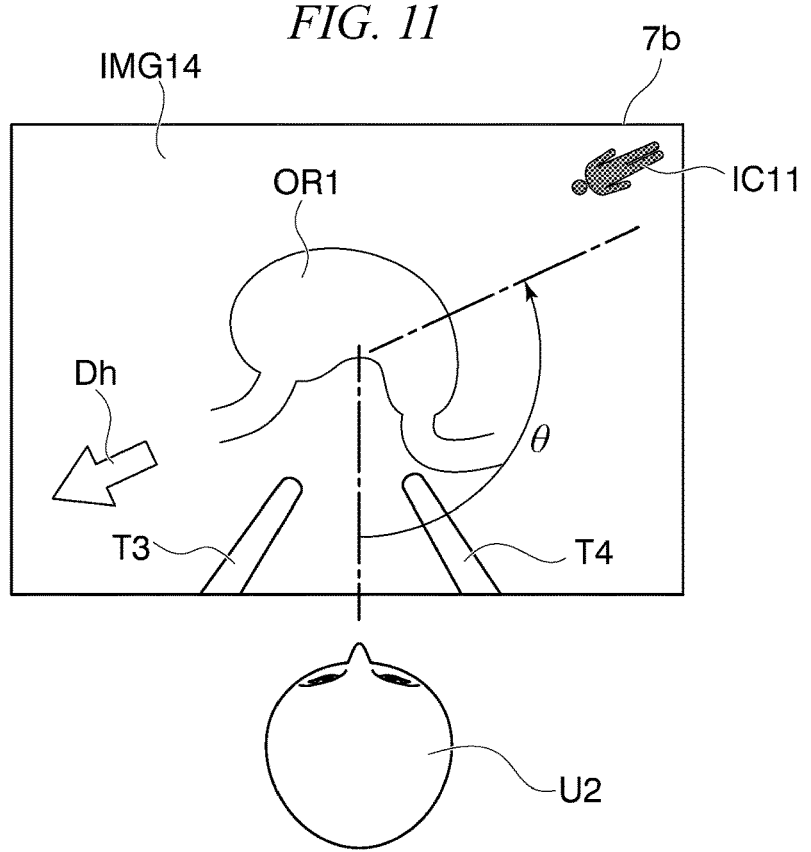
FIG. 11 is a diagram showing an example of an image displayed on the monitor in the first embodiment of the present disclosure.

FIG. 11 shows another example of an image displayed on the monitor 7b. The monitor 7b displays an image IMG14. Differences between the image IMG14 and the image IMG12 shown in FIG. 6 will be described. The processor 64 superimposes information indicating the angle $\theta$ on the image IMG14. In the example shown in FIG. 11, an icon IC11 similar to a shape of a human is displayed on the image IMG14. The icon IC11 is tilted in accordance with the angle $\theta$. The direction of the head indicated by the icon IC11 is the same as the direction Dh in the image IMG13. The assistant U2 can recognize a rotation direction and a rotation amount of the image IMG14 displayed on the monitor 7b.

The processor 64 may display a value of the angle $\varphi$ or the angle $\theta$ instead of the icon IC10 or the icon IC11 on the monitor 7a or the monitor 7b. For example, when the angle $\varphi$ is 45 degrees, the processor 64 may display characters "45" on the monitor 7a. The processor 64 may display a value including a positive or negative sign on the monitor 7a or the monitor 7b depending on whether the angle $\varphi$ or the angle $\theta$ is a clockwise or counterclockwise angle. The sign indicates a rotation direction of an image.

In the first embodiment, the endoscope system 1 performs the rotation processing of an image in accordance with an angle between the imaging direction of the imaging unit 21 and the reference direction of each monitor and displays the corrected image on each monitor. Due to this, the operator U1 or the assistant U2 can intuitively manipulate each treatment tool.

Second Embodiment

A second embodiment of the present disclosure will be described. When the depression angle of the imaging direction is within a predetermined range, for example, the depression angle is 30 degrees or more and 60 degrees or less, an image acquired by the imaging unit 21 contains distortion depending on the distance between the distal end of the imaging unit 21 and a subject.

Figure 12:
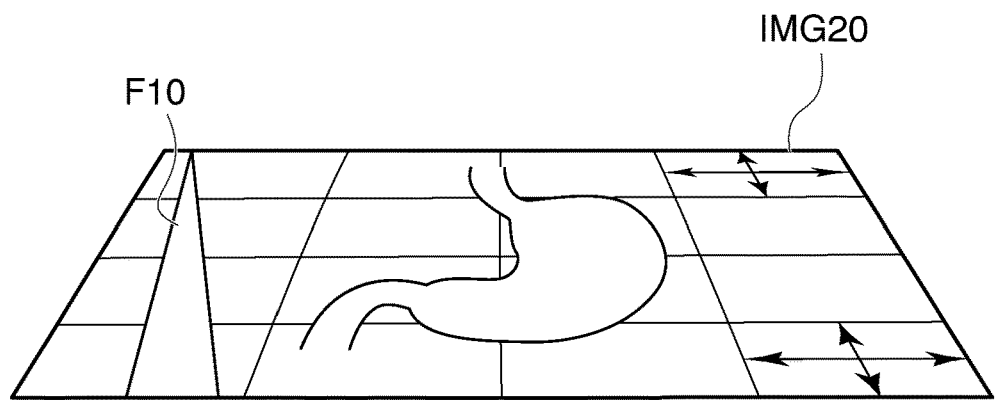
FIG. 12 is a diagram showing an example of an image acquired by an endoscope in a second embodiment of the present disclosure.

FIG. 12 shows an example of an image acquired by the imaging unit 21. An image IMG20 is shown in FIG. 12. A subject seen in an upper region in the image IMG20 is relatively far from the distal end of the imaging unit 21. Therefore, an image of the region is relatively reduced. On the other hand, a subject seen in a lower region in the image IMG20 is relatively close to the distal end of the imaging unit 21. Therefore, an image of the region is relatively magnified.

A figure F10 shown in FIG. 12 schematically indicates the magnification in the image IMG20. The horizontal width of the figure F10 indicates the size of the magnification. The figure F10 indicates that the magnification of the upper region in the image IMG20 is small and the magnification of the lower region in the image IMG20 is large. The difference of the magnification between regions in the image IMG20 causes distortion of the image IMG20.

Figure 13:
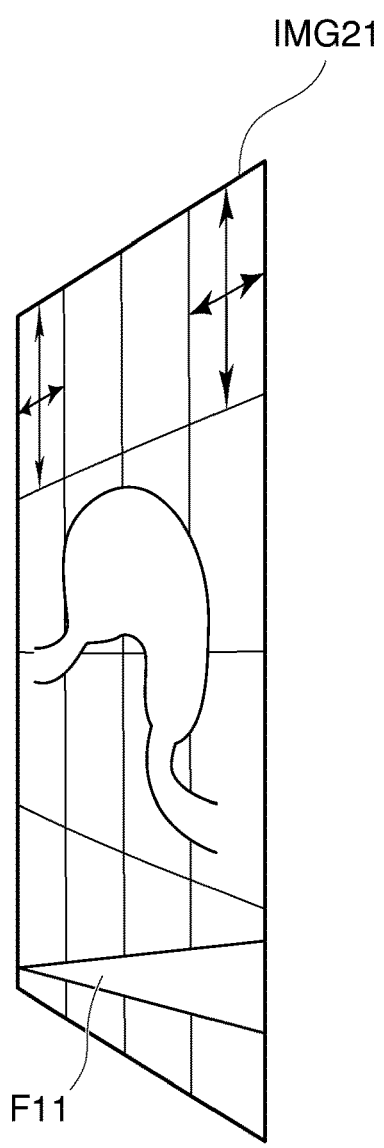
FIG. 13 is a diagram showing an example of an image on which rotation processing has been performed in the second embodiment of the present disclosure.

FIG. 13 shows an example of an image on which the rotation processing has been performed. An image IMG21 is shown in FIG. 13. The image IMG21 is obtained by rotating the image IMG20 shown in FIG. 12 by 90 degrees. A figure F11 shown in FIG. 13 schematically indicates the magnification in the image IMG21. The figure F11 indicates that the magnification of a left region in the image IMG21 is small and the magnification of a right region in the image IMG21 is large. Since the magnification of the left region in the image IMG21 and the magnification of the right region in the image IMG21 are different from each other, an observer feels unnatural.

The processor 64 executes the following processing in order to reduce distortion of an image. The processor 64 calculates a depression angle of the imaging direction of the imaging unit 21 as in the first embodiment. The processor 64 performs perspective correction on an image in accordance with the depression angle. By doing this, the processor 64 corrects distortion of the image, which is generated in accordance with the distance between the imaging unit 21 and a subject.

Figure 14:
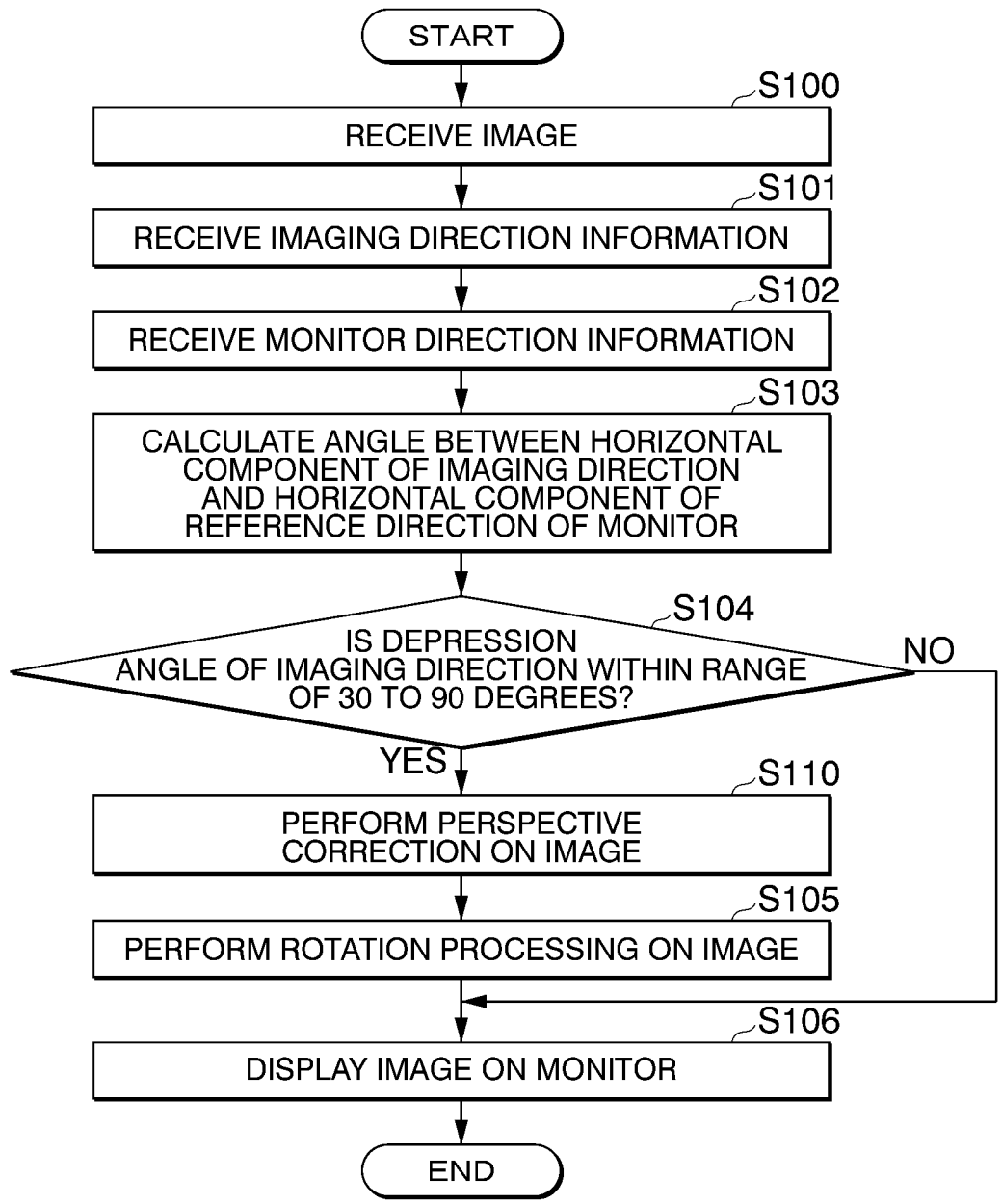
FIG. 14 is a flow chart showing a procedure of an operation of a processor unit in the second embodiment of the present disclosure.

An operation of the processor unit 6 will be described by using FIG. 14. FIG. 14 shows a procedure of the operation of the processor unit 6. Descriptions of the same processing as that shown in FIG. 9 will be omitted.

When the processor 64 determines that the depression angle of the imaging direction is within the range of 30 to 90 degrees in Step S104, the processor 64 performs the perspective correction in accordance with the depression angle of the imaging direction by using the image received in Step S100 (Step S110).

For example, the processor 64 enlarges the upper region in the image IMG20 shown in FIG. 12 and reduces the lower region in the image IMG20. When the depression angle is large, in other words, the depression angle is near 90 degrees, the difference between the magnification of an upper region in an image and the magnification of a lower region in the image is small. Therefore, the difference between a correction amount of the upper region in the image IMG20 and a correction amount of the lower region in the image IMG20 is small. On the other hand, when the depression angle is small, in other words, the depression angle is near 30 degrees, the difference between the magnification of an upper region in an image and the magnification of a lower region in the image is large. Therefore, the difference between a correction amount of the upper region in the image IMG20 and a correction amount of the lower region in the image IMG20 is large.

Figure 15:
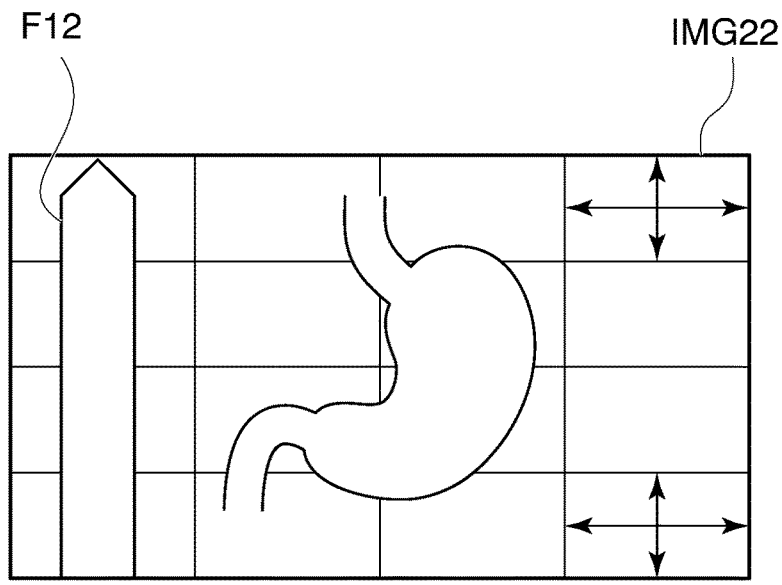
FIG. 15 is a diagram showing an example of an image on which perspective correction has been performed in the second embodiment of the present disclosure.

FIG. 15 shows an example of an image on which the perspective correction has been performed. An image IMG22 is shown in FIG. 15. The image IMG22 is obtained by performing the perspective correction on the image IMG20 shown in FIG. 12. A figure F12 shown in FIG. 15 schematically indicates the magnification in the image IMG22. The horizontal width of the figure F12 is uniform. In other words, the magnification is fixed in the image IMG22.

Figure 16:
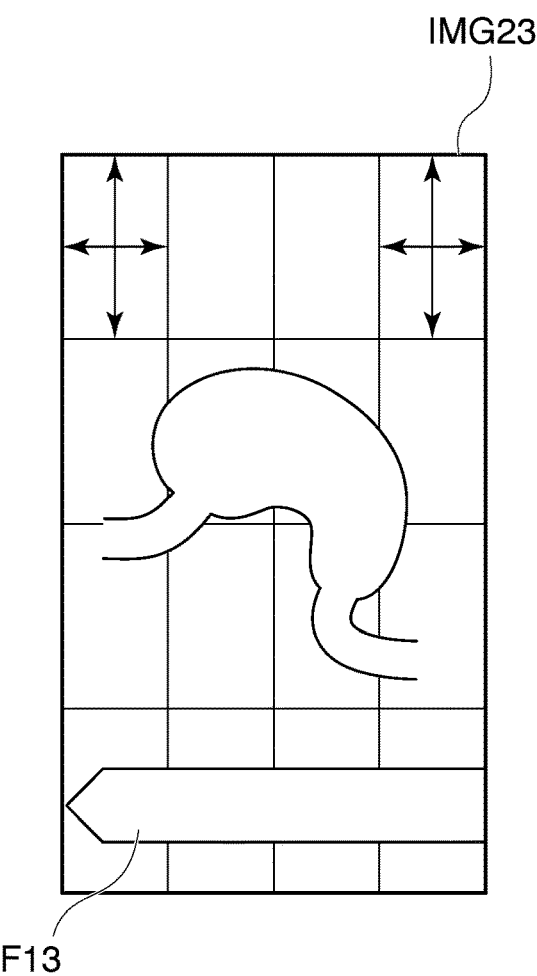
FIG. 16 is a diagram showing an example of an image on which the rotation processing has been performed in the second embodiment of the present disclosure.

After Step S110, the processor 64 performs the rotation processing on the image in Step S105. FIG. 16 shows an example of an image on which the rotation processing has been performed after the perspective correction is performed. An image IMG23 is shown in FIG. 16. The image IMG23 is obtained by rotating the image IMG22 shown in FIG. 15 by 90 degrees. A figure F13 shown in FIG. 16 schematically indicates the magnification in the image IMG23. The vertical width of the figure F13 is uniform. In other words, the magnification is fixed in the image IMG23. Since the magnification of a left region in the image IMG23 and the magnification of a right region in the image IMG23 are the same, an observer does not feel unnatural.

The order in which Step S110 and Step S105 are executed is not limited to that shown in FIG. 14. The processor 64 may perform the rotation processing on an image acquired by the imaging unit 21 and then may perform the perspective correction on the image.

In the second embodiment, the endoscope system 1 corrects distortion of an image, which is generated in accordance with the distance between the imaging unit 21 and a subject. The operator U1 and the assistant U2 can observe more natural image than that in the first embodiment.

Third Embodiment

A third embodiment of the present disclosure will be described. In the third embodiment, a head-mounted display (HMD) is used instead of the monitor 7a and the monitor 7b.

Figure 17:
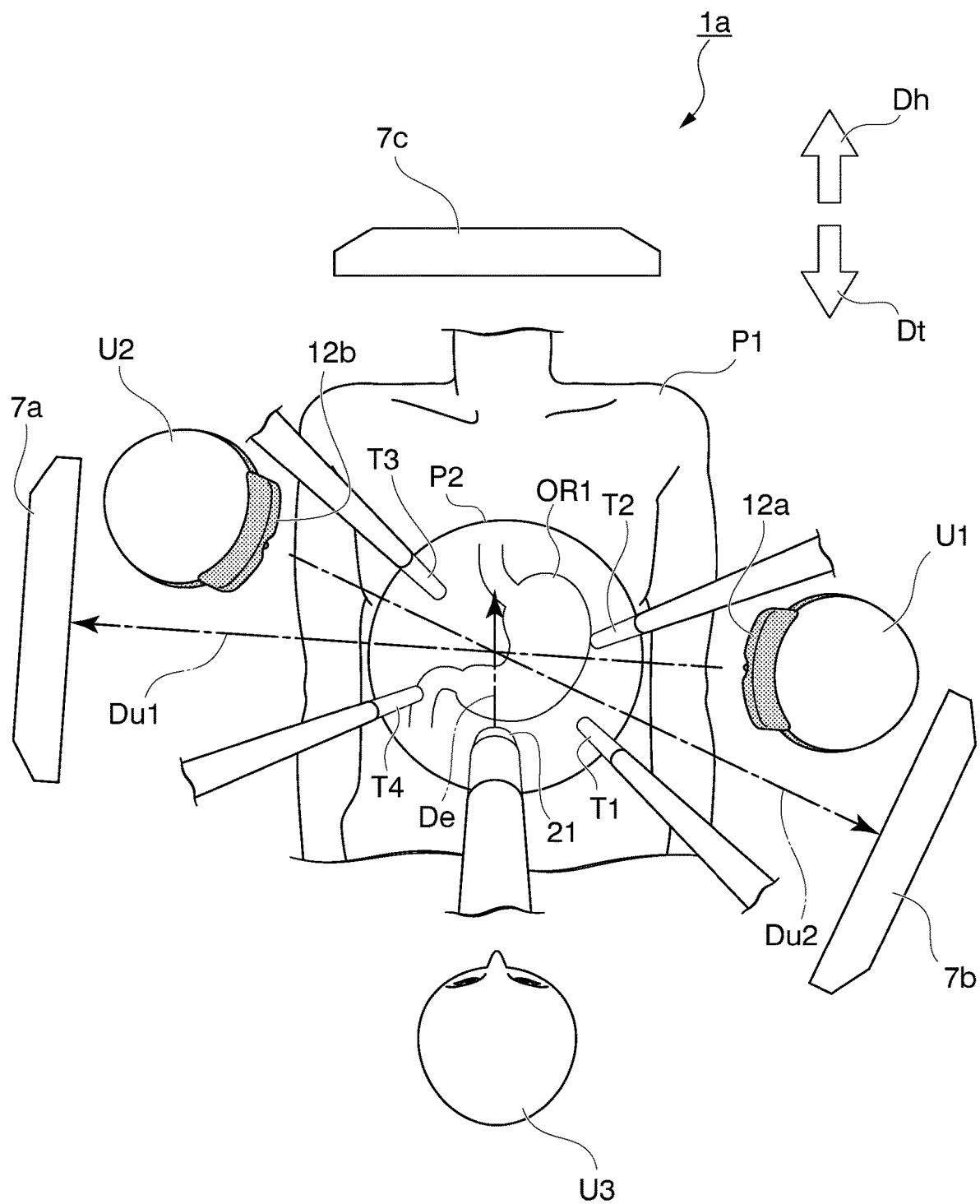
FIG. 17 is a schematic diagram showing a layout of an endoscope system according to a third embodiment of the present disclosure.

The endoscope system 1 shown in FIG. 2 is changed to an endoscope system 1a shown in FIG. 17. FIG. 17 schematically shows a layout of the endoscope system 1a in an operation room. Each configuration overlooked in a direction vertical to the ground is shown in FIG. 17. Descriptions of the same configuration as that shown in FIG. 2 will be omitted.

The endoscope system 1a includes an HMD 12a and an HMD 12b instead of the monitor 7a and the monitor 7b shown in FIG. 2. The HMD 12a is mounted on the head of the operator U1, and the HMD 12b is mounted on the head of the assistant U2.

Figure 18:
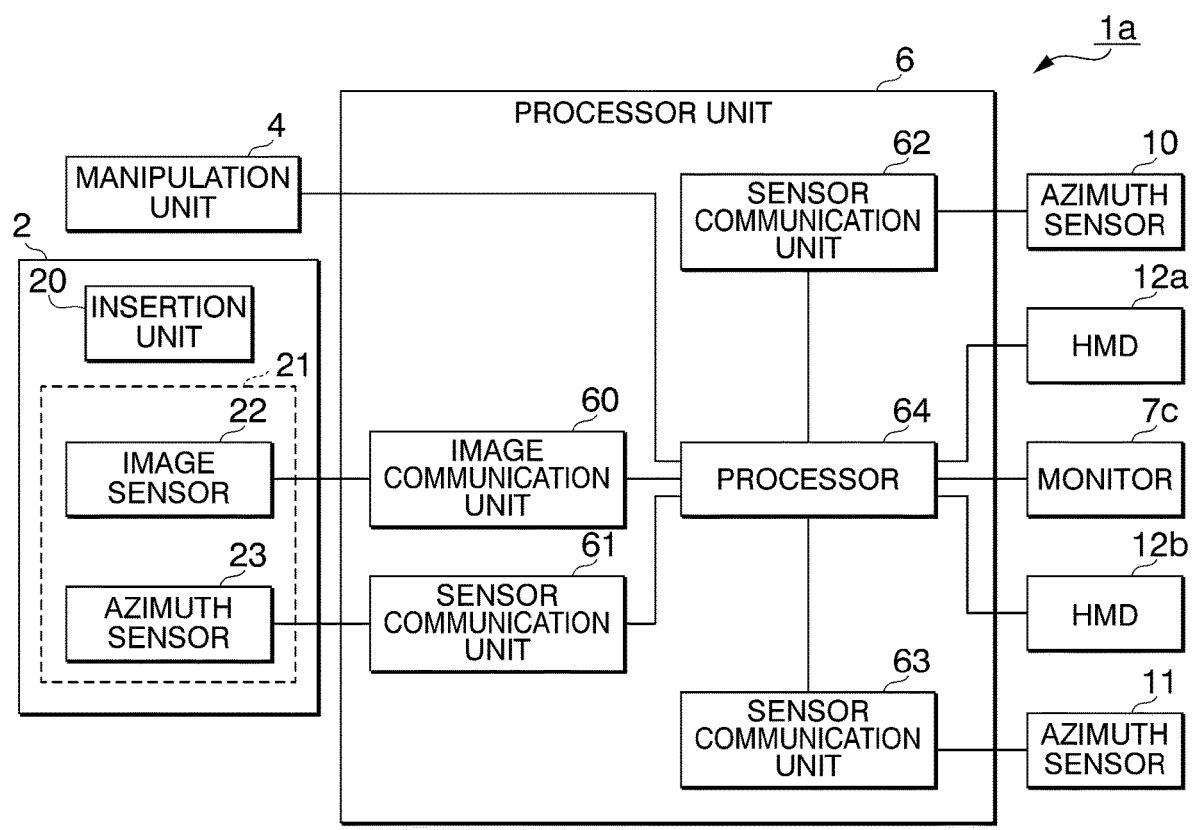
FIG. 18 is a block diagram showing a configuration of the endoscope system according to the third embodiment of the present disclosure.

FIG. 18 shows a configuration of the endoscope system 1a. Descriptions of the same configuration as that shown in FIG. 7 will be omitted.

For example, the azimuth sensor 10 is disposed on the surface of the HMD 12a, and the azimuth sensor 11 is disposed on the surface of the HMD 12b. The azimuth sensor 10 may be disposed inside the HMD 12a. The azimuth sensor 11 may be disposed inside the HMD 12b.

The azimuth sensor 10 measures a reference direction of the HMD 12a and generates HMD direction information indicating the measured reference direction. For example, the reference direction of the HMD 12a is a direction perpendicular to the screen of the HMD 12a. The azimuth sensor 11 measures a reference direction of the HMD 12b and generates HMD direction information indicating the measured reference direction. For example, the reference direction of the HMD 12b is a direction perpendicular to the screen of the HMD 12b. The HMD direction information is used instead of the monitor direction information.

The azimuth sensor 10 may be mounted on the body of the operator U1. For example, the azimuth sensor 10 is mounted on the head of the operator U1. The azimuth sensor 10 may be mounted on the trunk of the operator U1. The azimuth sensor 10 measures a reference direction of the operator U1 and generates user direction information indicating the measured reference direction. For example, the reference direction of the operator U1 is the same as the visual line direction of the operator U1. The user direction information is used instead of the monitor direction information. For example, the reference direction of the operator U1 is a direction opposite to the reference direction of the monitor 7a shown in FIG. 7. By using this relationship, it is possible to replace the monitor direction information with the user direction information.

The azimuth sensor 11 may be mounted on the body of the assistant U2. For example, the azimuth sensor 11 is mounted on the head of the assistant U2. The azimuth sensor 11 may be mounted on the trunk of the assistant U2. The azimuth sensor 11 measures a reference direction of the assistant U2 and generates user direction information indicating the measured reference direction. For example, the reference direction of the assistant U2 is the same as the visual line direction of the assistant U2. The user direction information is used instead of the monitor direction information. For example, the reference direction of the assistant U2 is a direction opposite to the reference direction of the monitor 7b shown in FIG. 7. By using this relationship, it is possible to replace the monitor direction information with the user direction information.

An operation of the processor unit 6 is the same as that shown in FIG. 9 or FIG. 14.

In the third embodiment, the endoscope system 1a performs the rotation processing of an image in accordance with an angle between the imaging direction of the imaging unit 21 and the reference direction of the operator U1 (or the assistant U2) and displays the corrected image on each monitor. Due to this, the operator U1 or the assistant U2 can intuitively manipulate each treatment tool.

Fourth Embodiment

A fourth embodiment of the present disclosure will be described. In the fourth embodiment, the processor 64 measures a horizontal component of the reference direction of the operator U1 or the assistant U2 by using an image in which a treatment tool held by the operator U1 or the assistant U2 is seen.

Figure 19:
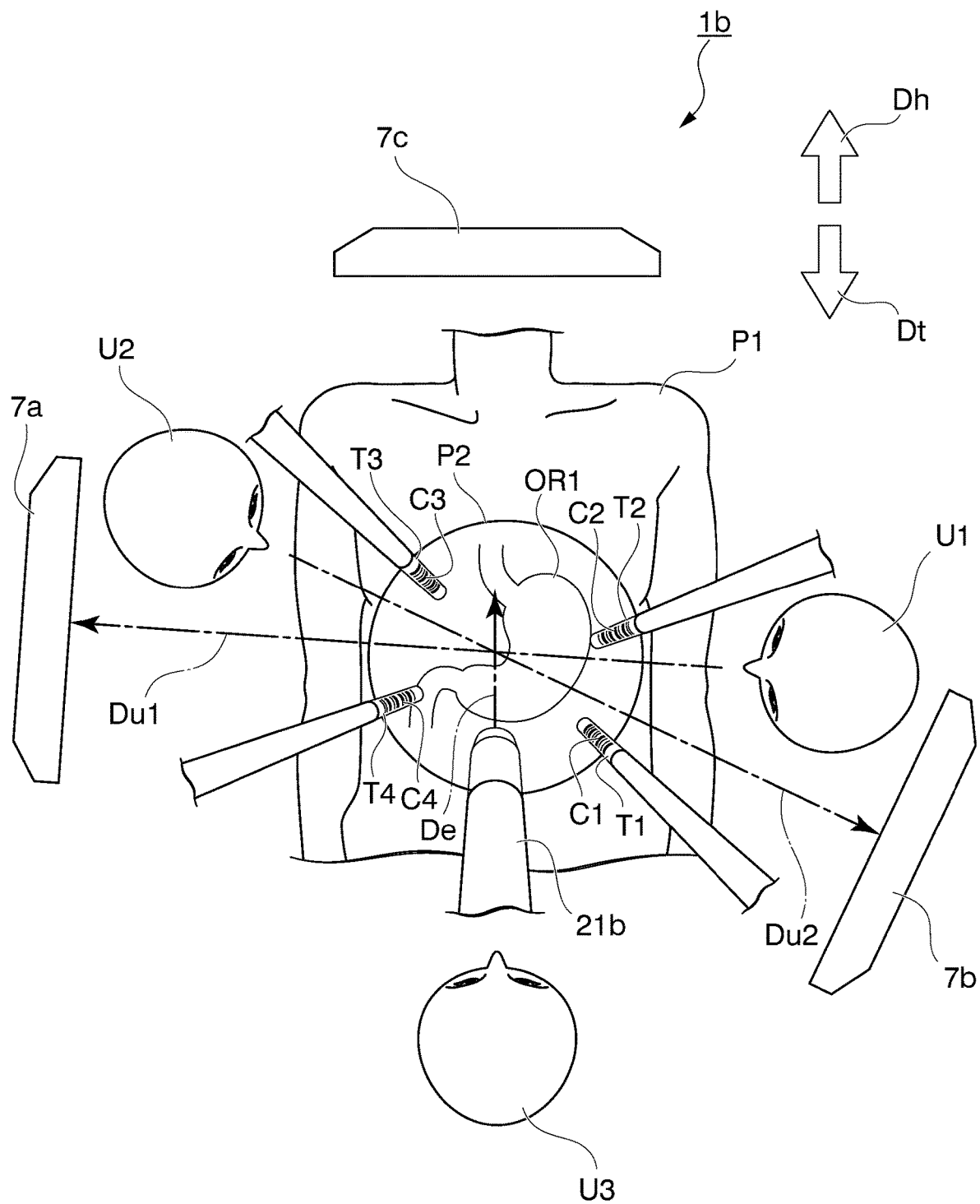
FIG. 19 is a schematic diagram showing a layout of an endoscope system according to a fourth embodiment of the present disclosure.

The endoscope system 1 shown in FIG. 2 is changed to an endoscope system 1b shown in FIG. 19. FIG. 19 schematically shows a layout of the endoscope system 1b in an operation room. Each configuration overlooked in a direction vertical to the ground is shown in FIG. 19. Descriptions of the same configuration as that shown in FIG. 2 will be omitted.

A code unique to each treatment tool is attached to the surface of each treatment tool. A code C1 is attached to the treatment tool T1, a code C2 is attached to the treatment tool T2, a code C3 is attached to the treatment tool T3, and a code C4 is attached to the treatment tool T4. The code C1, the code C2, the code C3, and the code C4 are different from each other. Each code is positioned close to the distal end of each treatment tool. Each code may be a one-dimensional code or a two-dimensional code.

Figure 20:
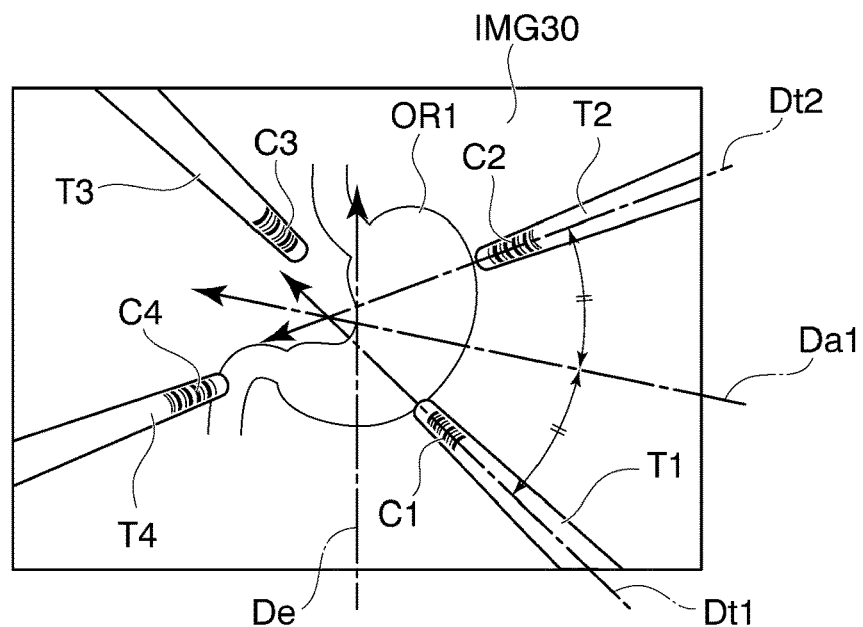
FIG. 20 is a diagram showing an example of an image acquired by an endoscope in the fourth embodiment of the present disclosure.

The imaging unit 21 shown in FIG. 2 is changed to an imaging unit 21b shown in FIG. 19. FIG. 20 shows an example of an image acquired by the imaging unit 21b. An image IMG30 is shown in FIG. 20. The organ OR1, the treatment tools T1 to T4, and the codes C1 to C4 are seen in the image IMG30. The processor 64 analyzes the image IMG30 so as to detect each code seen in the image IMG30. By doing this, the processor 64 detects each treatment tool. The processor 64 determines that the operator U1 is manipulating the treatment tool T1 and the treatment tool T2 both extending from the right side in the image IMG30 toward the center part of the image IMG30.

The processor 64 calculates a direction Dt1 of the treatment tool T1 and a direction Dt2 of the treatment tool T2. The processor 64 calculates an average of the direction Dt1 and the direction Dt2 so as to calculate a direction Da1. The direction Da1 indicates the reference direction of the operator U1. The direction Da1 is close to the horizontal component of the reference direction of the operator U1.

An imaging direction De of the imaging unit 21b is shown in FIG. 20. The imaging direction De is close to the horizontal component of the imaging direction of the imaging unit 21b. The imaging direction De is close to the upward direction in the image IMG30. The processor 64 calculates the direction Da1 with respect to the imaging direction De. The direction Da1 corresponds to an angle between the imaging direction De and the reference direction of the operator U1.

Figure 21:
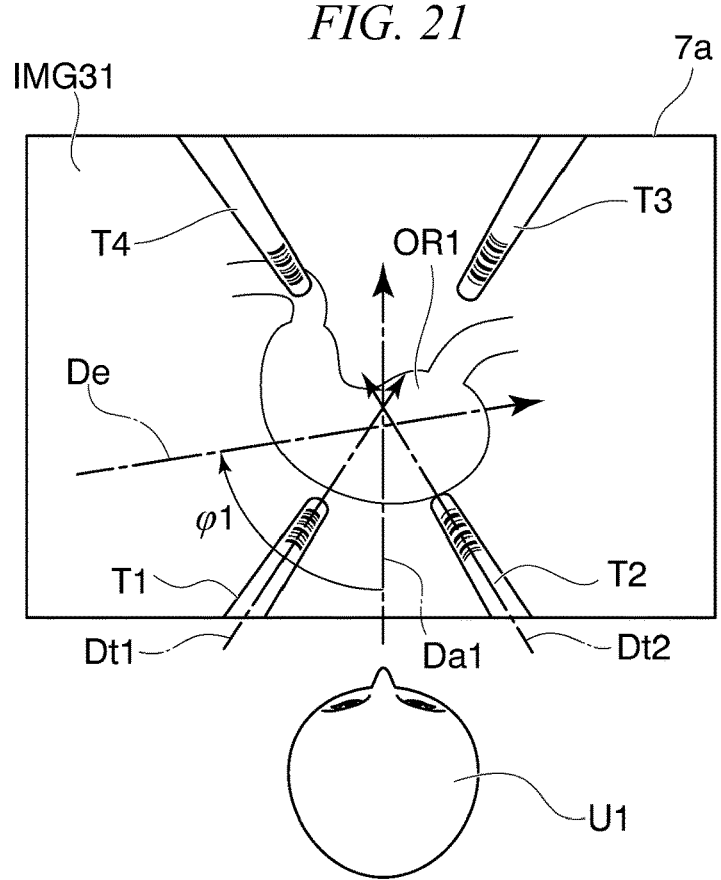
FIG. 21 is a diagram showing an example of an image displayed on a monitor in the fourth embodiment of the present disclosure.

FIG. 21 shows an example of an image displayed on the monitor 7a. The monitor 7a displays an image IMG31. The processor 64 rotates the image IMG30 shown in FIG. 20 such that the direction Da1 matches the upward direction. In the example shown in FIG. 21, the processor 64 rotates the image IMG30 clockwise by an angle φ1 so as to obtain the image IMG31. The imaging direction De is changed to a direction close to the right direction in the image IMG31.

The processor 64 executes similar processing to the above so as to perform the rotation processing of an image displayed on the monitor 7b. Hereinafter, this rotation processing will be described.

Figure 22:
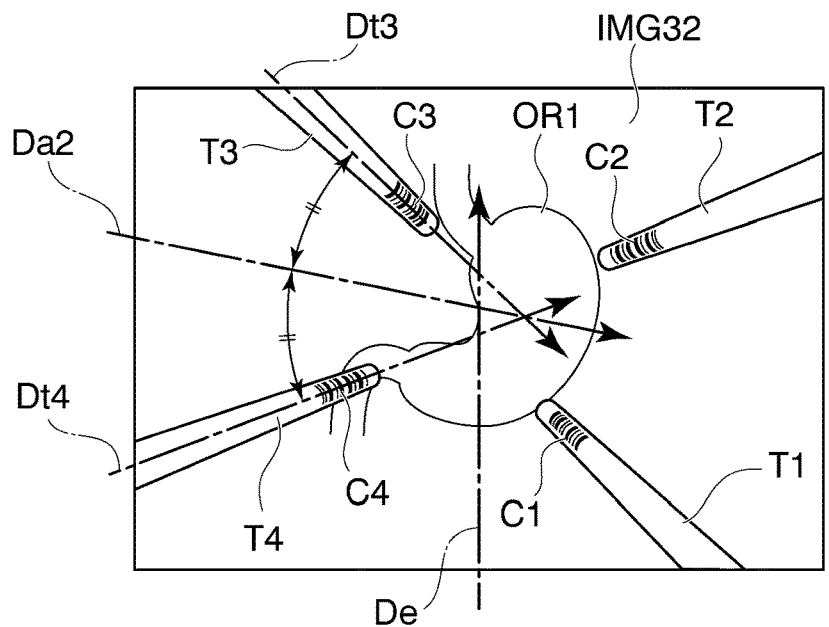
FIG. 22 is a diagram showing an example of an image acquired by the endoscope in the fourth embodiment of the present disclosure.

FIG. 22 shows an example of an image acquired by the imaging unit 21b. An image IMG32 is shown in FIG. 22. The organ OR1, the treatment tools T1 to T4, and the codes C1 to C4 are seen in the image IMG32. The processor 64 analyzes the image IMG32 so as to detect each code seen in the image IMG32. By doing this, the processor 64 detects each treatment tool. The processor 64 determines that the assistant U2 is manipulating the treatment tool T3 and the treatment tool T4 both extending from the left side in the image IMG32 toward the center part of the image IMG32.

The processor 64 calculates a direction Dt3 of the treatment tool T3 and a direction Dt4 of the treatment tool T4. The processor 64 calculates an average of the direction Dt3 and the direction Dt4 so as to calculate a direction Da2. The direction Da2 indicates the reference direction of the assistant U2. The direction Da2 is close to the horizontal component of the reference direction of the assistant U2.

An imaging direction De of the imaging unit 21b is shown in FIG. 22. The imaging direction De is close to the horizontal component of the imaging direction of the imaging unit 21b. The imaging direction De is close to the upward direction in the image IMG32. The processor 64 calculates the direction Da2 with respect to the imaging direction De. The direction Da2 corresponds to an angle between the imaging direction De and the reference direction of the assistant U2.

Figure 23:
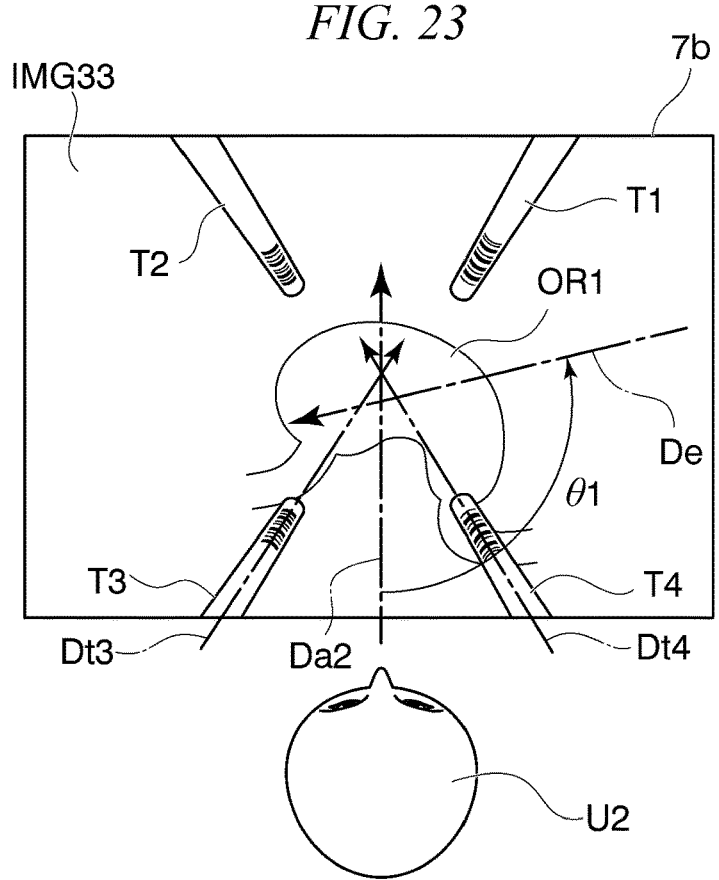
FIG. 23 is a diagram showing an example of an image displayed on the monitor in the fourth embodiment of the present disclosure.

FIG. 23 shows an example of an image displayed on the monitor 7b. The monitor 7b displays an image IMG33. The processor 64 rotates the image IMG32 shown in FIG. 22 such that the direction Da2 matches the upward direction. In the example shown in FIG. 23, the processor 64 rotates the image IMG32 counterclockwise by an angle θ1 so as to obtain the image IMG33. The imaging direction De is changed to a direction close to the left direction in the image IMG33.

Figure 24:
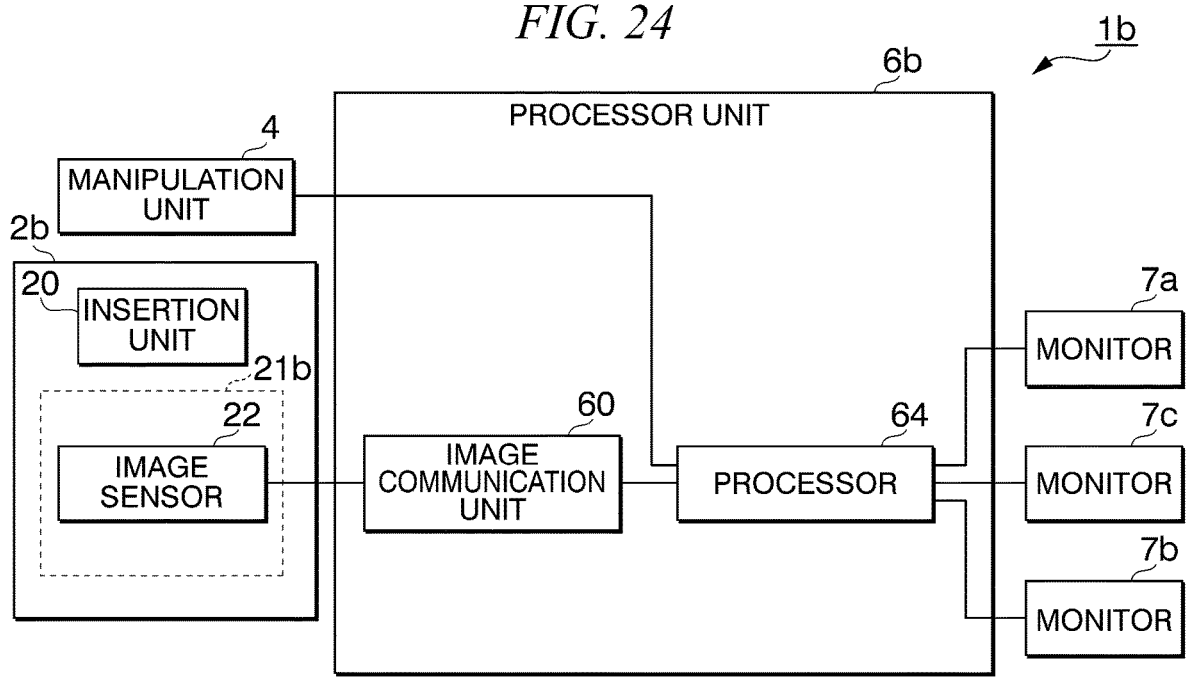
FIG. 24 is a block diagram showing a configuration of the endoscope system according to the fourth embodiment of the present disclosure.

FIG. 24 shows a configuration of the endoscope system 1b. Descriptions of the same configuration as that shown in FIG. 7 will be omitted.

The endoscope insertion unit 2 shown in FIG. 7 is changed to an endoscope insertion unit 2b shown in FIG. 24. The imaging unit 21 shown in FIG. 7 is changed to an imaging unit 21b shown in FIG. 24. The imaging unit 21b includes the image sensor 22. The imaging unit 21b does not include the azimuth sensor 23 shown in FIG. 7.

The processor unit 6 shown in FIG. 7 is changed to a processor unit 6b shown in FIG. 24. The processor unit 6b includes the image communication unit 60 and the processor 64. The processor unit 6b does not include the sensor communication unit 61, the sensor communication unit 62, and the sensor communication unit 63 shown in FIG. 7.

The processor 64 functions as a first measuring instrument that measures a first direction indicating a horizontal component of the imaging direction of the imaging unit 21b. In addition, the processor 64 functions as a second measuring instrument that measures a second direction indicating a horizontal component of the reference direction of the monitor 7a or the monitor 7b.

Figure 25:
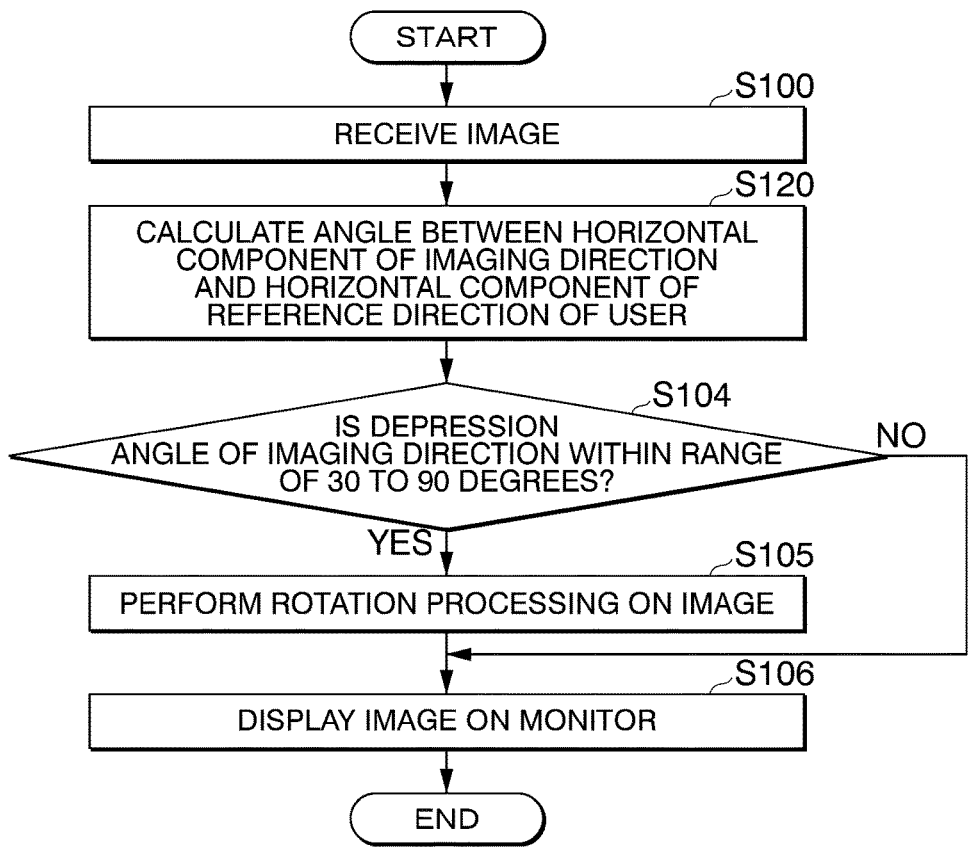
FIG. 25 is a flow chart showing a procedure of an operation of a processor unit in the fourth embodiment of the present disclosure.

An operation of the processor unit 6b will be described by using FIG. 25. FIG. 25 shows a procedure of the operation of the processor unit 6b. Descriptions of the same processing as that shown in FIG. 9 will be omitted.

After Step S100, the following Step S120 is executed. Step S101 and Step S102 shown in FIG. 9 are not executed.

The processor 64 calculates the direction Da1 shown in FIG. 20 and the direction Da2 shown in FIG. 22. By doing this, the processor 64 calculates an angle between the horizontal component of the imaging direction and the horizontal component of the reference direction of a user (the operator U1 or the assistant U2) (Step S120). After Step S120, Step S104 is executed.

If each treatment tool frequently moves, a rotation angle of an image frequently changes. Therefore, the operator U1 or the assistant U2 may feel troublesome. In order to avoid this, the processor 64 may execute the following first processing or second processing.

The first processing will be described. When Step S120 is executed for the first time, the angle calculated in Step S120 is stored as an angle for processing. After Step S120 is executed again, the processor 64 calculates an absolute value of the difference between the angle calculated this time and the angle for processing.

When the absolute value is a predetermined angle or less, the processor 64 performs the rotation processing by using an angle stored as the angle for processing. The predetermined angle is 5 degrees, 10 degrees, or the like. When the absolute value is greater than the predetermined angle, the processor 64 performs the rotation processing by using the angle calculated this time. The angle calculated this time is newly stored as an angle for processing.

The second processing will be described. When Step S120 is executed for the first time, the angle calculated in Step S120 is stored as an angle for processing. Step S120 and Step S105 are repeatedly executed, but only Step S120 is executed each time a predetermined time has passed. Therefore, the rate at which Step S120 is executed is lower than that at which Step S105 is executed. For example, the predetermined time is 1 second or more and 5 seconds or less. The processor 64 performs the rotation processing by using an angle stored as the angle for processing. When Step S120 is executed, the angle calculated in Step S120 is newly stored as an angle for processing. The angle for processing is updated each time the predetermined time has passed.

The imaging unit 21b acquires an image at a predetermined frame rate. In the above described first and second processing, the processor 64 calculates the angle φ or the angle θ shown in FIG. 2 at a lower rate than the frame rate.

The processor 64 may detect only one treatment tool from the right or left side in an image acquired by the imaging unit 21b. In such a case, the processor 64 rotates the image such that the treatment tool faces in almost vertical direction in the image. The distal end of the treatment tool faces upward in the image, and the proximal end of the treatment tool faces downward in the image.

The operator U1 or the assistant U2 may insert or pull out a treatment tool. When the treatment tool is inserted or pulled out, the number of treatment tools detected in the above-described processing changes from 1 to 2 or changes from 2 to 1. Due to this change, a rotation angle of an image may suddenly change. Therefore, the sense of direction of the operator U1 or the assistant U2 may not follow an actual change of direction. In order to avoid this, the processor 64 may execute the following processing.

When the number of treatment tools detected from an image has changed, the processor 64 gradually changes the rotation angle of the image. For example, before the number of treatment tools changes, the angle calculated in Step S120 is a first angle. After the number of treatment tools changes, the angle calculated in Step S120 is a second angle. The processor 64 gradually changes the rotation angle of the image from the first angle to the second angle in a predetermined time. For example, the predetermined time is 1 second or more and 5 seconds or less.

The HMD 12a shown in FIG. 17 may be used instead of the monitor 7a, and the HMD 12b shown in FIG. 17 may be used instead of the monitor 7b.

In the fourth embodiment, the endoscope system 1b calculates a direction of each treatment tool by using an image acquired by the imaging unit 21b. The endoscope system 1b performs the rotation processing of the image based on the direction of each treatment tool. The endoscope system 1b can easily perform the rotation processing of the image without using an azimuth sensor.

Fifth Embodiment

A fifth embodiment of the present disclosure will be described. In the fifth embodiment, the endoscope system 1 shown in FIG. 7 is used. After the rotation processing is performed on an image, part of the image is not displayed on the monitor 7.

Figure 26:
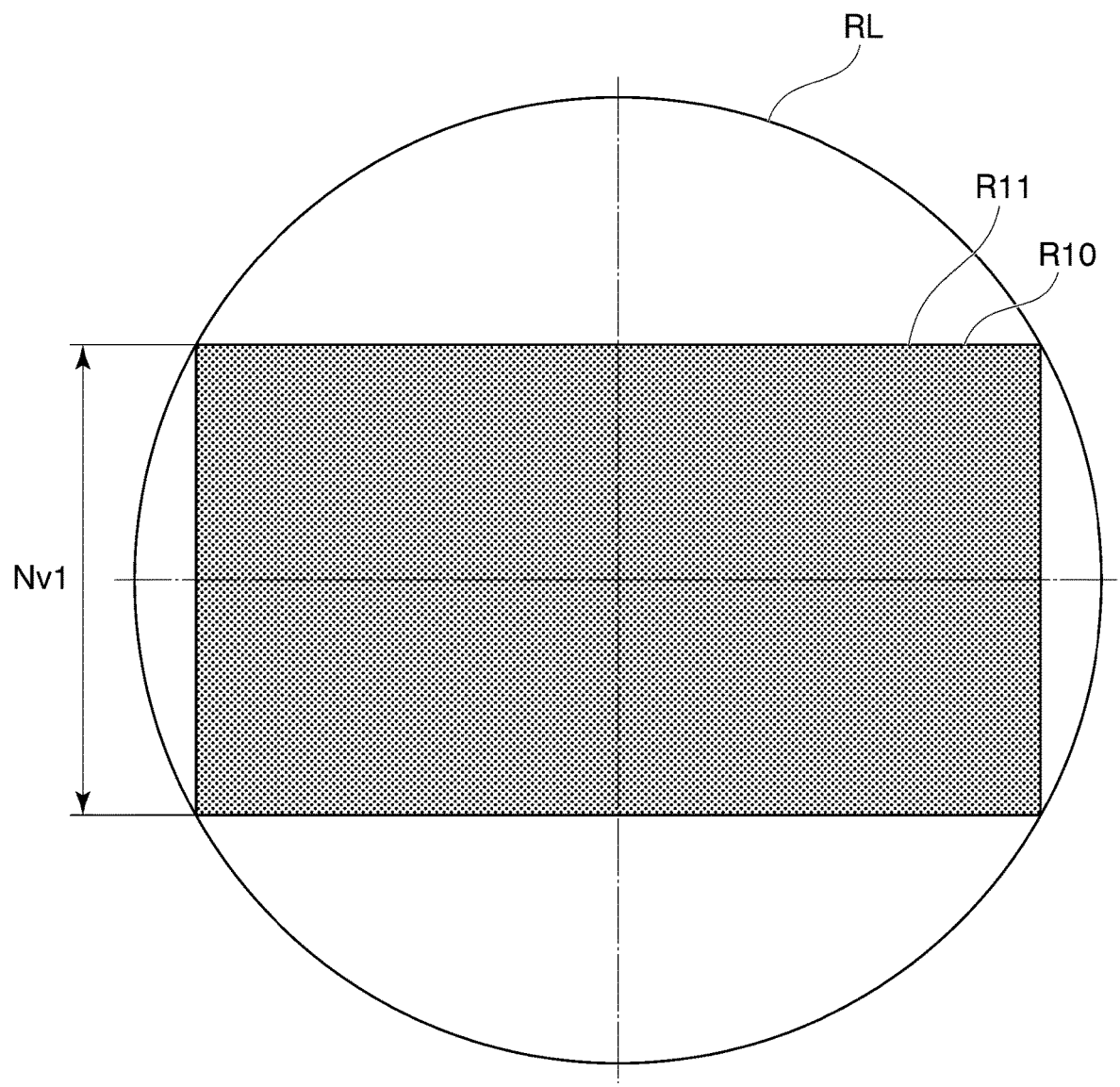
FIG. 26 is a diagram showing a range of an image displayed on a monitor in the first to fourth embodiments of the present disclosure.
Figure 27:
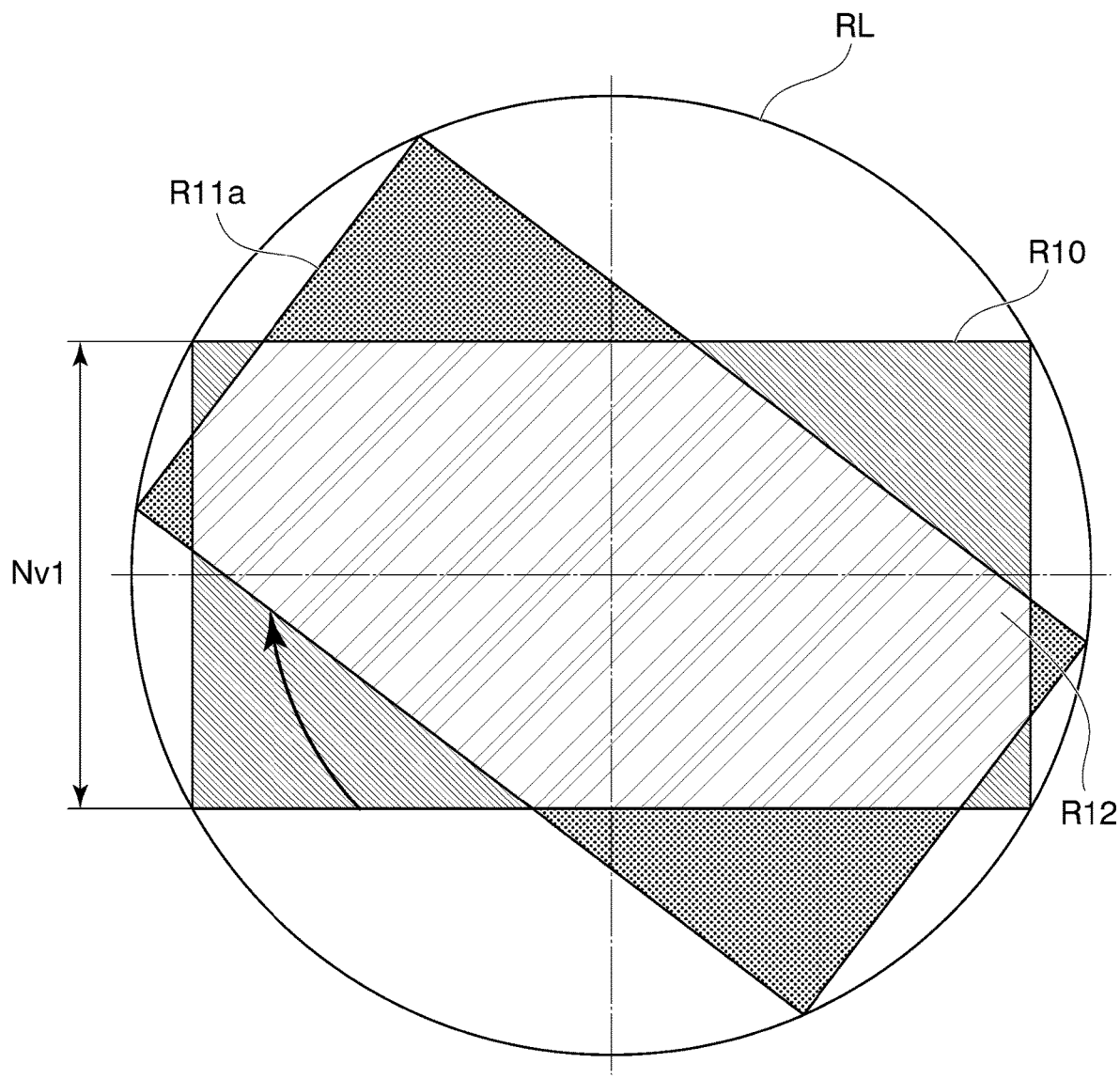
FIG. 27 is a diagram showing a range of an image displayed on a monitor in the first to fourth embodiments of the present disclosure.

FIG. 26 and FIG. 27 show a range of an image displayed on the monitor 7 in the first to fourth embodiments. FIG. 26 shows a range of an image displayed on the monitor 7 in a case in which the rotation processing of the image is not performed. An image-forming range RL, an effective range R10, and a display range R11 are shown in FIG. 26.

Light passing through a lens included in the imaging optical system is incident on an imaging region of the image sensor 22. The image-forming range RL indicates a range in which an optical image is formed on the image sensor 22 by the imaging optical system. The imaging optical system forms the optical image in a circular region, the center of which is the optical axis of the imaging optical system. The effective range R10 indicates a range of an image corresponding to an effective pixel region of the image sensor 22. A vertical pixel number (effective vertical pixel number) of the effective range R10 is Nv1. The image sensor 22 outputs an image of only the effective range R10 out of the image-forming range RL. The display range R11 indicates a range of an image displayed on the monitor 7. A vertical pixel number of the display range R11 is Nv1. In a case in which the rotation processing of an image is not performed, the display range R11 is the same as the effective range R10. The monitor 7 displays the entire image output from the image sensor 22.

FIG. 27 shows a range of an image displayed on the monitor 7 in a case in which the rotation processing of the image has been performed. An image-forming range RL, an effective range R10, and a display range R11a are shown in FIG. 27. The image-forming range RL shown in FIG. 27 is the same as the image-forming range RL shown in FIG. 26, and the effective range R10 shown in FIG. 27 is the same as the effective range R10 shown in FIG. 26.

In a case in which the rotation processing of the image has been performed, the display range R11 shown in FIG. 26 is changed to the display range R11a. An image of only a range R12 in which the effective range R10 and the display range R11a overlap each other is displayed on the monitor 7. Therefore, part of the image on which the rotation processing has been performed is not displayed on the monitor 7 (blackout).

In the fifth embodiment, the effective vertical pixel number of the image sensor 22 is changed. The effective vertical pixel number of the image sensor 22 is greater than a vertical pixel number of an image displayed on the monitor 7.

Figure 28:
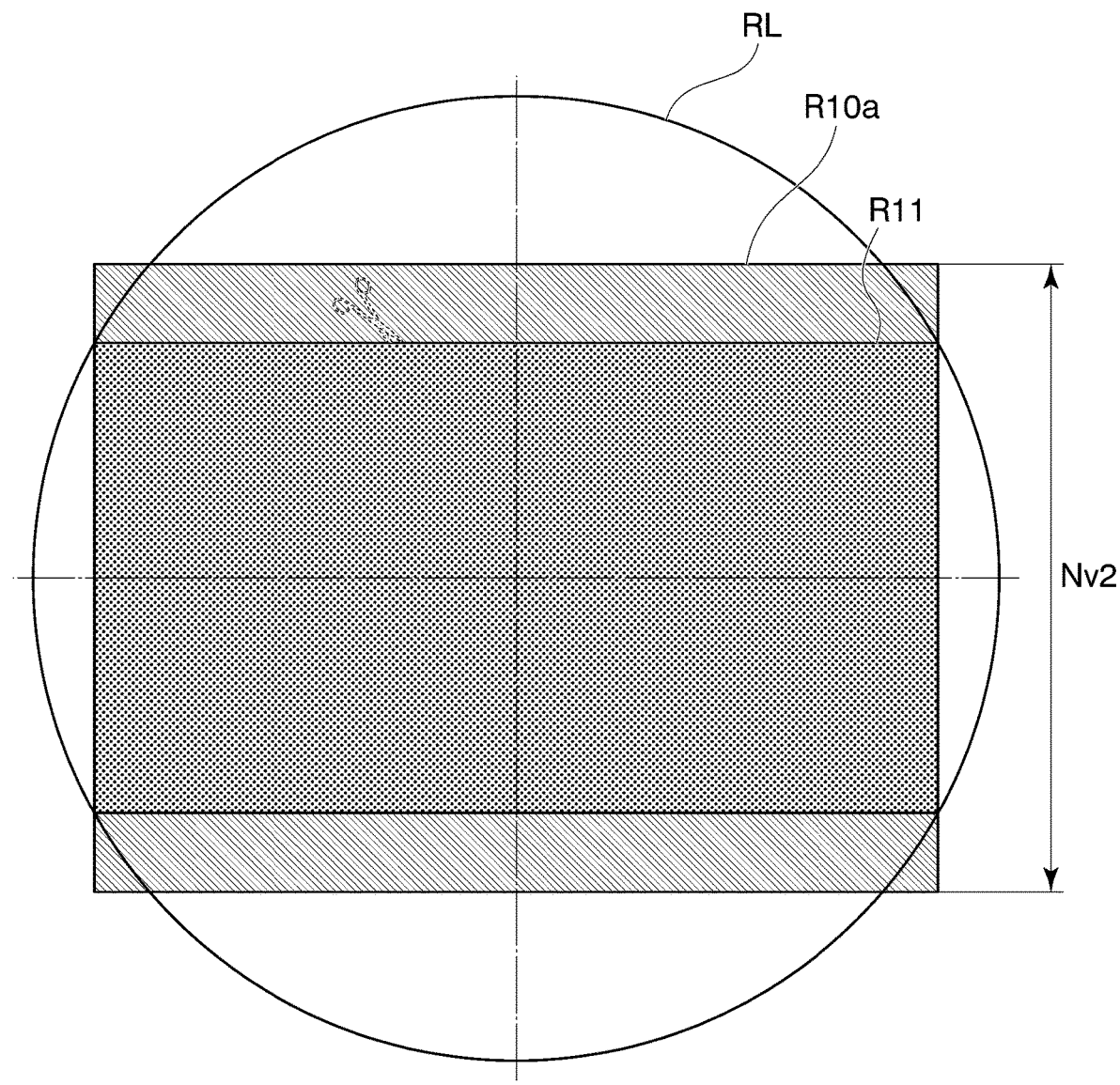
FIG. 28 is a diagram showing a range of an image displayed on a monitor in a fifth embodiment of the present disclosure.
Figure 29:
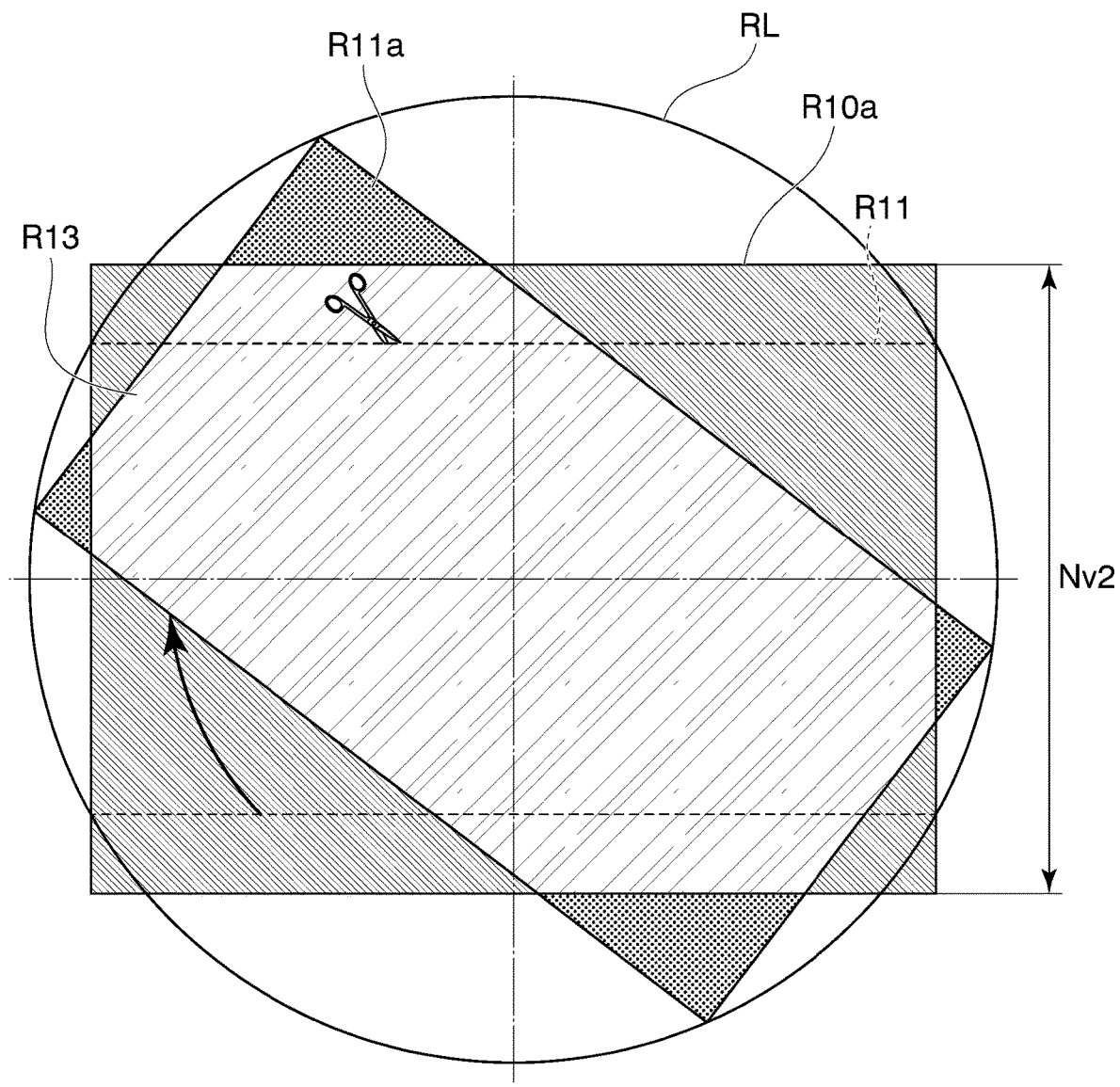
FIG. 29 is a diagram showing a range of an image displayed on the monitor in the fifth embodiment of the present disclosure.

FIG. 28 and FIG. 29 show a range of an image displayed on the monitor 7 in the fifth embodiment. FIG. 28 shows a range of an image displayed on the monitor 7 in a case in which the rotation processing of the image is not performed. An image-forming range RL, an effective range R10a, and a display range R11 are shown in FIG. 28. The image-forming range RL shown in FIG. 28 is the same as the image-forming range RL shown in FIG. 26, and the display range R11 shown in FIG. 28 is the same as the display range R11 shown in FIG. 26.

The effective range R10 shown in FIG. 26 is changed to the effective range R10a shown in FIG. 28. A vertical pixel number (effective vertical pixel number) of the effective range R10a is Nv2. The vertical pixel number Nv2 is greater than the vertical pixel number Nv1 shown in FIG. 26. In a case in which the rotation processing of an image is not performed, the display range R11 is included in the effective range R10a. The monitor 7 displays an image of only the display range R11 out of the image output from the image sensor 22. An image of a range that is included in the effective range R10a and is not included in the display range R11 is not displayed on the monitor 7.

FIG. 29 shows a range of an image displayed on the monitor 7 in a case in which the rotation processing of the image has been performed. An image-forming range RL, an effective range R10a, and a display range R11a are shown in FIG. 29. The image-forming range RL shown in FIG. 29 is the same as the image-forming range RL shown in FIG. 28, and the effective range R10a shown in FIG. 29 is the same as the effective range R10a shown in FIG. 28.

In a case in which the rotation processing of the image has been performed, the display range R11 shown in FIG. 28 is changed to the display range R11a. An image of only a range R13 in which the effective range R10a and the display range R11a overlap each other is displayed on the monitor 7. Therefore, part of the image on which the rotation processing has been performed is not displayed on the monitor 7.

The image sensor 22 does not output an image of a range that is included in the display range R11a shown in FIG. 27 and is not included in the effective range R10 shown in FIG. 27. The monitor 7 does not display the image of the range. Similarly, the image sensor 22 does not output an image of a range that is included in the display range R11a shown in FIG. 29 and is not included in the effective range R10a shown in FIG. 29. The monitor 7 does not display the image of the range. The range of the image that is not displayed on the monitor 7 in FIG. 29 is smaller than that of the image that is not displayed on the monitor 7 in FIG. 27. The range R13 shown in FIG. 29 is larger than the range R12 shown in FIG. 27.

The HMD 12a shown in FIG. 17 may be used instead of the monitor 7a, and the HMD 12b shown in FIG. 17 may be used instead of the monitor 7b.

In the fifth embodiment, the endoscope system 1 can reduce a range of an image that is not displayed on the monitor 7 when the rotation processing has been performed.

Sixth Embodiment

A sixth embodiment of the present disclosure will be described. In the sixth embodiment, the endoscope system 1 shown in FIG. 7 is used.

When the imaging direction of the imaging unit 21 is close to the horizontal direction, the up-and-down direction in an image acquired by the imaging unit 21 is close to a direction (vertical direction) that is vertical to the horizontal plane. The up-and-down direction in an image on which the rotation processing has been performed deviates from the direction vertical to the horizontal plane. When the angle φ and the angle θ shown in FIG. 4 are close to 180 degrees in particular, the upward direction in an image is close to the actual downward direction and the downward direction in the image is close to the actual upward direction. Therefore, the up-and-down direction recognized in the image by the operator U1 and the assistant U2 is opposite the actual up-and-down direction.

In the sixth embodiment, when the depression angle of the imaging direction is smaller than a preset first angle and an angle between a first direction and a second direction is larger than a preset second angle, the processor 64 performs horizontal flip processing (mirror inversion processing). The first direction indicates the horizontal component of the imaging direction. The second direction indicates the horizontal component of the reference direction of the monitor 7. The right and left of an image is flipped through the horizontal flip processing.

Figure 30:
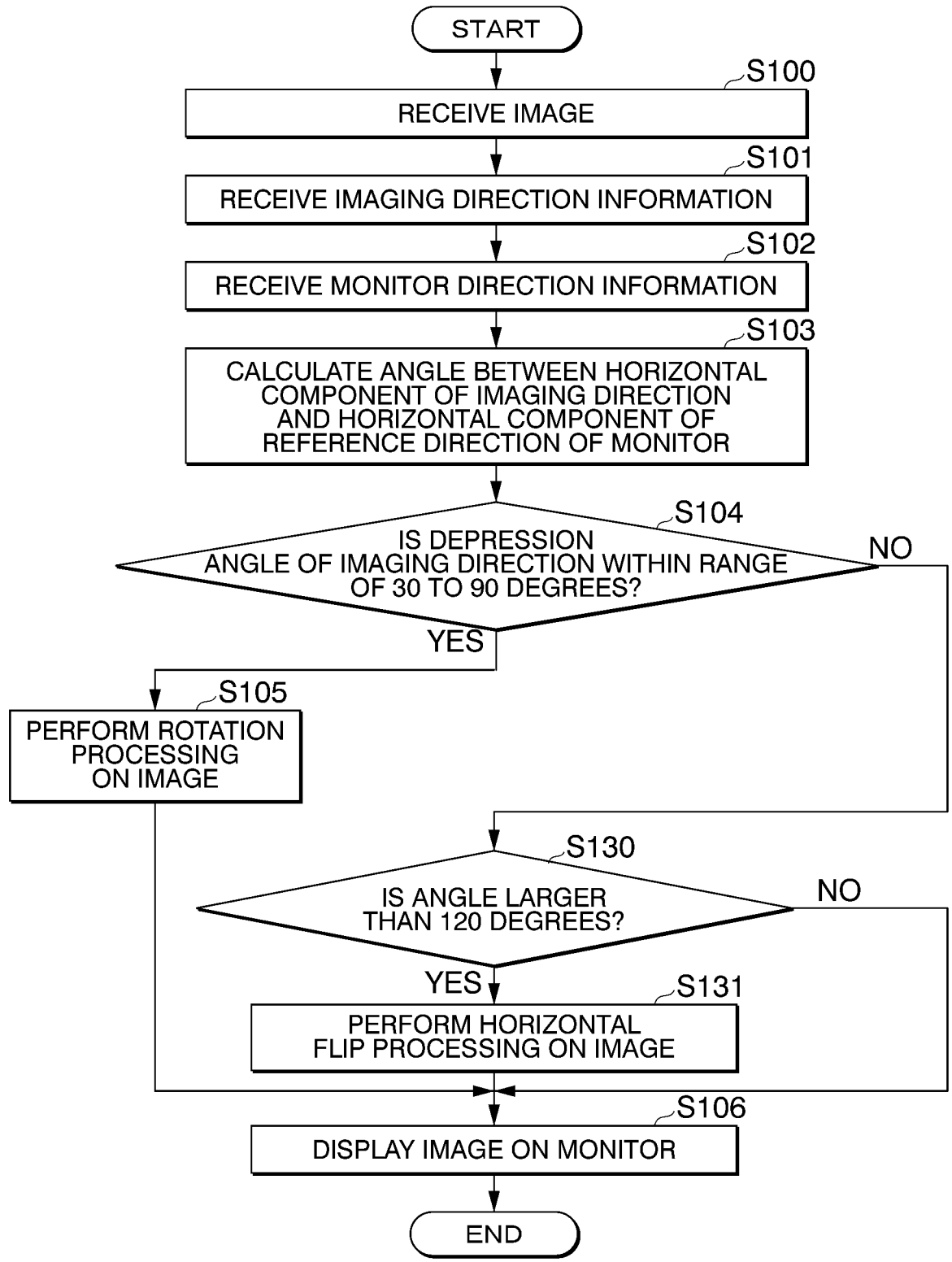
FIG. 30 is a flow chart showing a procedure of an operation of a processor unit in a sixth embodiment of the present disclosure.

An operation of the processor unit 6 will be described by using FIG. 30. FIG. 30 shows a procedure of the operation of the processor unit 6. Descriptions of the same processing as that shown in FIG. 9 will be omitted.

The processor 64 determines whether the depression angle of the imaging direction is within a range of 30 degrees (first angle) to 90 degrees in Step S104. When the depression angle of the imaging direction is 30 degrees or more and 90 degrees or less, the imaging unit 21 acquires an image of a subject seen below the horizontal direction. In this case, the processor 64 determines that the depression angle of the imaging direction is within the range of 30 to 90 degrees and executes Step S105. The horizontal flip processing is not performed on the image acquired by the imaging unit 21.

When the depression angle of the imaging direction is less than 30 degrees, the imaging unit 21 acquires an image of the subject seen in a direction close to the horizontal direction. In this case, the processor 64 determines that the depression angle of the imaging direction is not within the range of 30 to 90 degrees and executes the following Step S130.

The processor 64 determines whether the angle calculated in Step S103 is larger than 120 degrees (second angle) (Step S130).

When the processor 64 determines that the angle calculated in Step S103 is 120 degrees or less, Step S106 is executed. The horizontal flip processing is not performed on the image acquired by the imaging unit 21.

When the processor 64 determines that the angle calculated in Step S103 is larger than 120 degrees, the processor 64 performs the horizontal flip processing on the image received in Step S100 so as to correct the image (Step S131). After Step S131, Step S106 is executed.

The above-described 120 degrees are an example of a threshold value used for determining the size of an angle. The threshold value is not limited to 120 degrees. The threshold value may be 135 degrees or the like.

Figure 31:
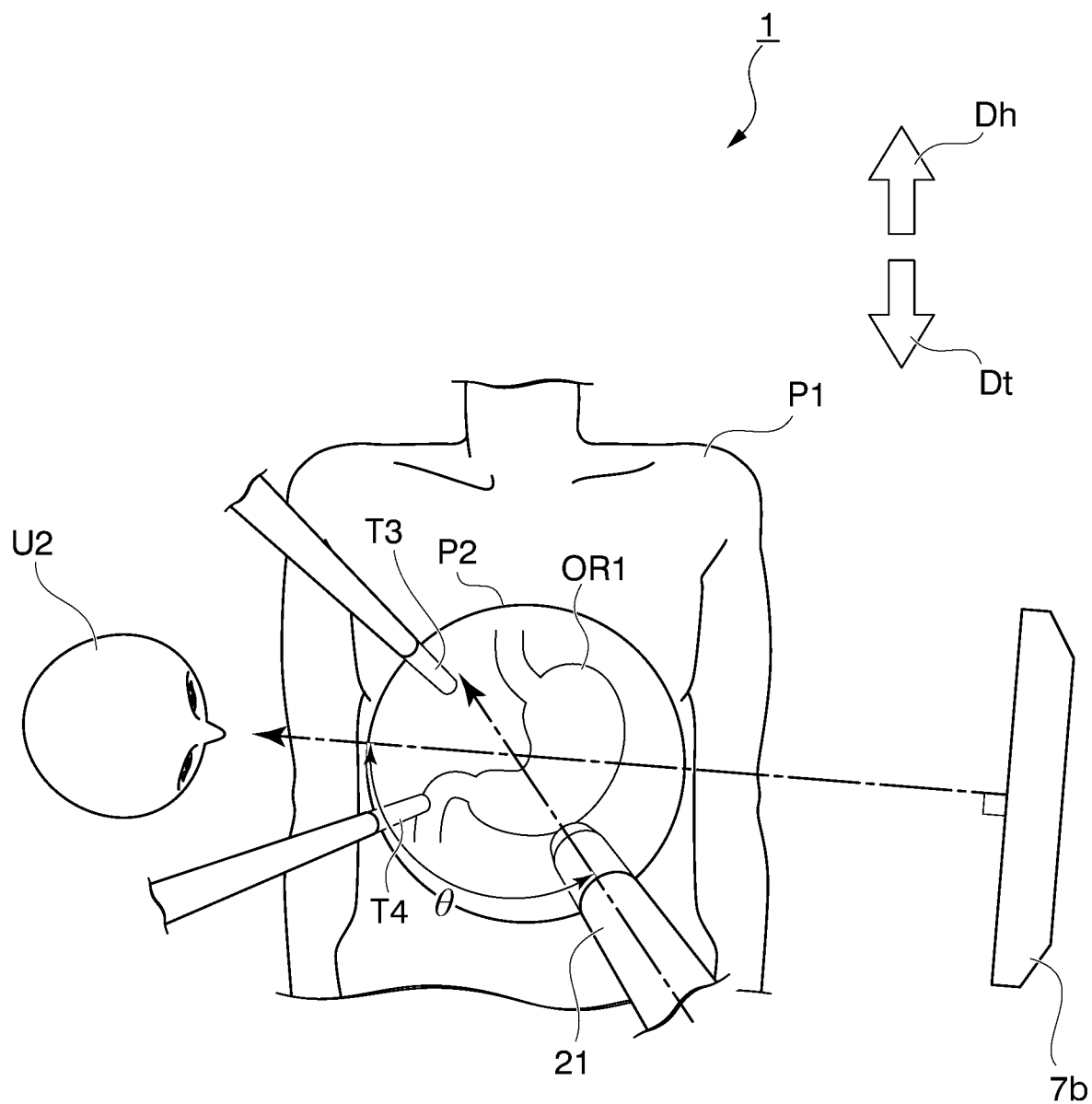
FIG. 31 is a schematic diagram showing a layout of an endoscope system according to the sixth embodiment of the present disclosure.

FIG. 31 schematically shows a layout of the endoscope system 1 in an operation room. Each configuration overlooked in a direction vertical to the ground is shown in FIG. 31. Descriptions of the same configuration as that shown in FIG. 2 will be omitted.

The monitor 7a, the monitor 7c, the operator U1, the scopist U3, the treatment tool T1, and the treatment tool T2 are not shown in FIG. 31. The angle θ shown in FIG. 31 is larger than 120 degrees. Therefore, the processor 64 performs the horizontal flip processing on an image acquired by the imaging unit 21.

Figure 32:
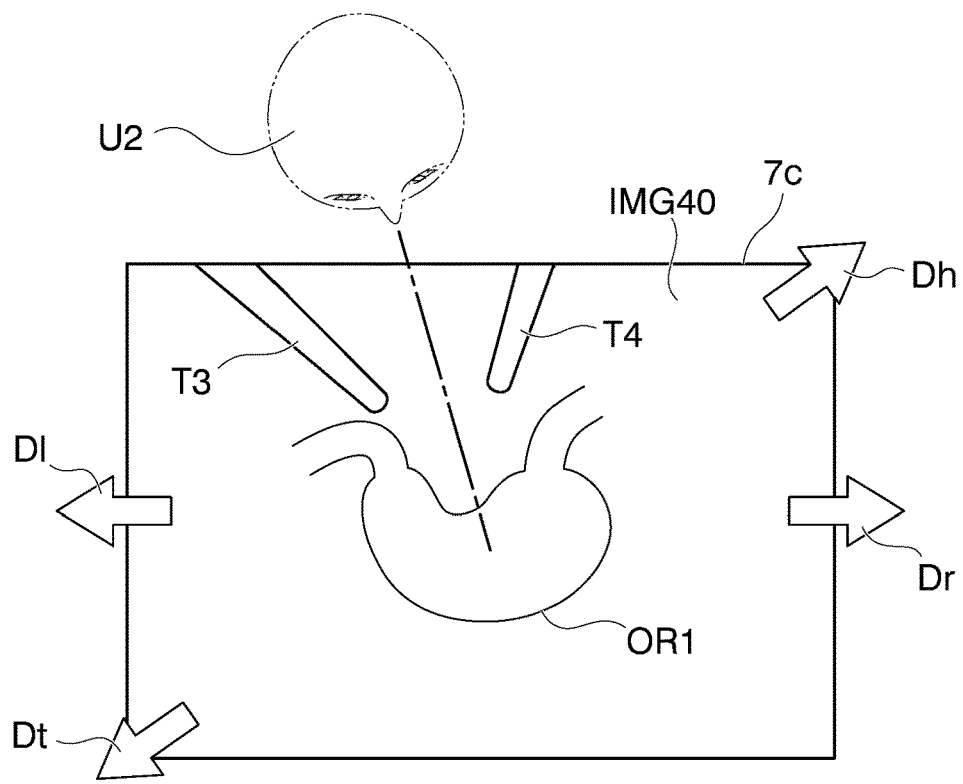
FIG. 32 is a diagram showing an example of an image displayed on a monitor in the sixth embodiment of the present disclosure.

FIG. 32 shows an example of an image displayed on the monitor 7c. The monitor 7c displays an image IMG40 acquired by the imaging unit 21. The organ OR1, the treatment tool T3, and the treatment tool T4 are seen in the image IMG40.

The direction Dh and the direction Dt are shown in FIG. 32. The direction Dh indicates a direction from the center of the trunk of the patient P1 toward the head of the patient P1. The direction Dh is close to a right direction Dr in the image IMG40. The direction Dt indicates a direction opposite to the direction Dh. The direction Dt is close to a left direction Dl in the image IMG40.

The treatment tool T3 and the treatment tool T4 are seen in the upper region of the image IMG40. The treatment tool T4 is seen on the right side of the treatment tool T3.

Figure 33:
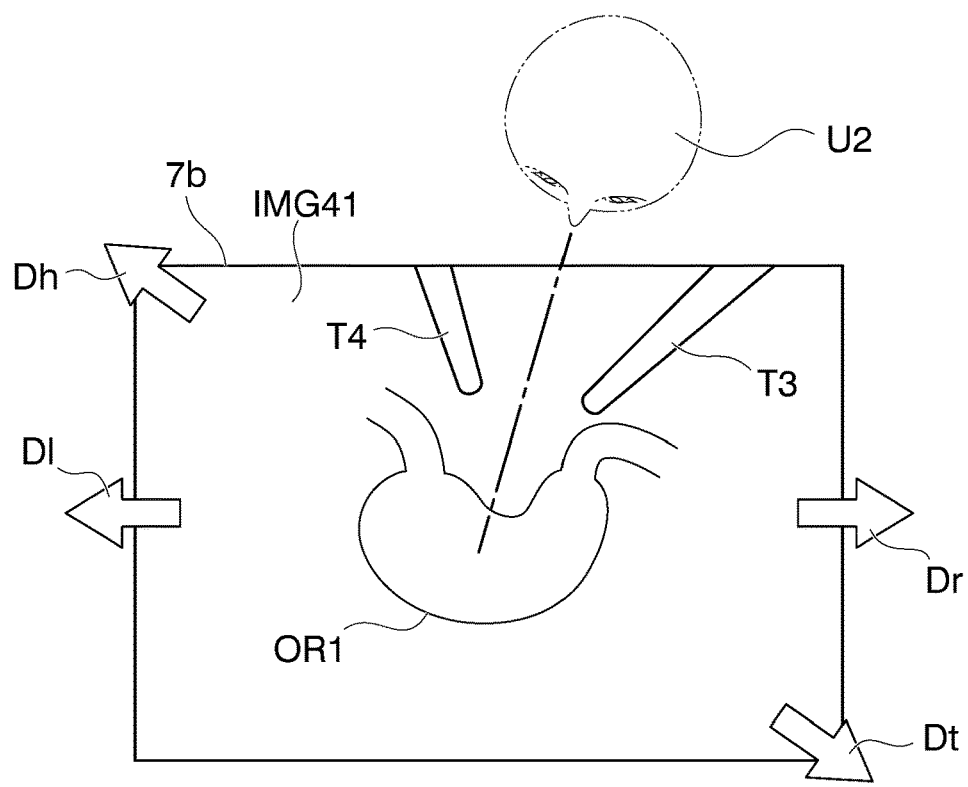
FIG. 33 is a diagram showing an example of an image displayed on the monitor in the sixth embodiment of the present disclosure.

FIG. 33 shows an example of an image displayed on the monitor 7b. The monitor 7b displays an image IMG41. The image IMG41 is obtained by performing the horizontal flip processing on the image IMG40 shown in FIG. 32. The direction Dh is close to a left direction Dl in the image IMG41. The direction Dt is close to a right direction Dr in the image IMG41.

The treatment tool T3 and the treatment tool T4 are seen in the upper region of the image IMG41. The treatment tool T4 is seen on the left side of the treatment tool T3. A positional relationship between the treatment tool T3 and the treatment tool T4 in FIG. 33 is different from that between the treatment tool T3 and the treatment tool T4 in FIG. 32. The assistant U2 manipulates the treatment tool T4 with the left hand and manipulates the treatment tool T3 with the right hand. A positional relationship between the treatment tool T3 and the treatment tool T4 in the horizontal direction in the image IMG41 is the same as that between the treatment tool T3 and the treatment tool T4 seen from the assistant U2. Therefore, the assistant U2 can intuitively manipulate each treatment tool.

Figure 34:
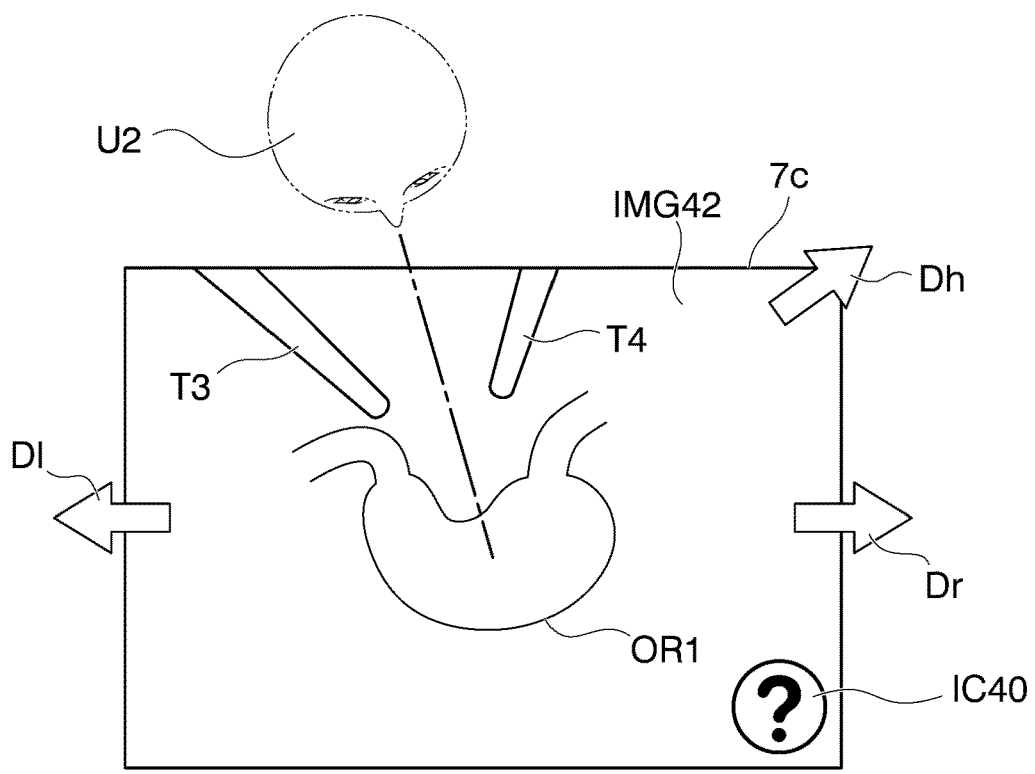
FIG. 34 is a diagram showing an example of an image displayed on the monitor in the sixth embodiment of the present disclosure.

FIG. 34 shows another example of an image displayed on the monitor 7c. The monitor 7c displays an image IMG42. Differences between the image IMG42 and the image IMG40 shown in FIG. 32 will be described. The processor 64 superimposes, on the image IMG42, information indicating whether the horizontal flip processing has been performed on the image IMG42. In the example shown in FIG. 34, an icon IC40 is displayed on the image IMG42. The icon IC40 indicates that the horizontal flip processing has not been performed on the image IMG42. The scopist U3 can recognize that the image IMG42 displayed on the monitor 7c has not been horizontally flipped.

Figure 35:
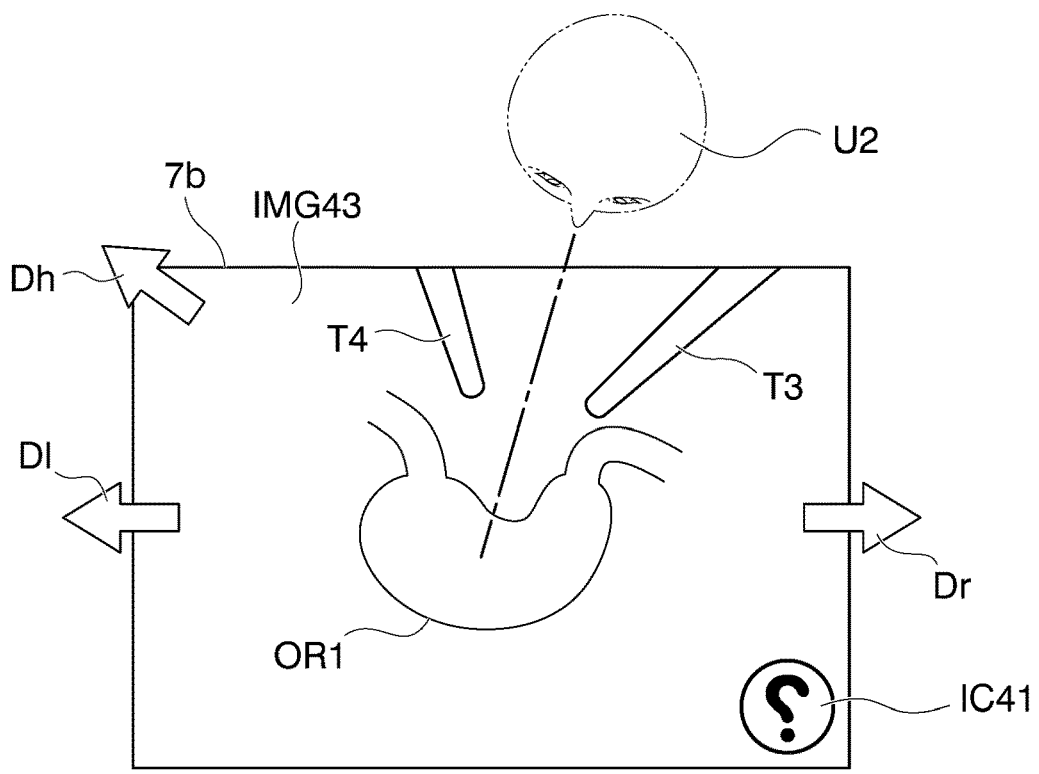
FIG. 35 is a diagram showing an example of an image displayed on the monitor in the sixth embodiment of the present disclosure.

FIG. 35 shows another example of an image displayed on the monitor 7b. The monitor 7b displays an image IMG43. Differences between the image IMG43 and the image IMG41 shown in FIG. 33 will be described. The processor 64 superimposes, on the image IMG43, information indicating whether the horizontal flip processing has been performed on the image IMG43. In the example shown in FIG. 35, an icon IC41 is displayed on the image IMG43. The icon IC41 indicates that the horizontal flip processing has been performed on the image IMG43. The assistant U2 can recognize that the image IMG43 displayed on the monitor 7b has been horizontally flipped.

The HMD 12a shown in FIG. 17 may be used instead of the monitor 7a, and the HMD 12b shown in FIG. 17 may be used instead of the monitor 7b.

In the sixth embodiment, when the depression angle of the imaging direction is small and an angle between the horizontal component of the imaging direction and the horizontal component of the reference direction of each monitor is large, the endoscope system 1 performs the horizontal flip processing. Due to this, the vertical direction in an image displayed on the monitor 7a or the monitor 7b almost matches the actual vertical direction, and the left-and-right direction in the image almost matches the actual left-and-right direction. Therefore, the operator U1 or the assistant U2 can intuitively manipulate each treatment tool.

Seventh Embodiment

A seventh embodiment of the present disclosure will be described. In the seventh embodiment, the endoscope system 1 shown in FIG. 7 is used. The endoscope system 1 displays a stereoscopic image (3D image). Hereinafter, an example in which the imaging unit 21 acquires an image of a subject seen below the horizontal direction will be described.

The imaging unit 21 acquires, as an image of a subject, a left image and a right image used for displaying a stereoscopic image. The image sensor 22 of the imaging unit 21 generates the left image and the right image. The processor 64 performs the rotation processing on the left image and the right image related to an image displayed on the monitor 7b. At this time, the processor 64 rotates the left image and the right image by 180 degrees in order to maintain the display of the stereoscopic image.

In this state, the perspective state of an image changes. In other words, the appearance of the image changes such that a distant subject appears close and a close subject appears distant. Therefore, the processor 64 performs processing of replacing the left image and the right image with each other. The processor 64 treats the left image on which the rotation processing has been performed as a right image. In addition, the processor 64 treats the right image on which the rotation processing has been performed as a left image.

Figure 36:
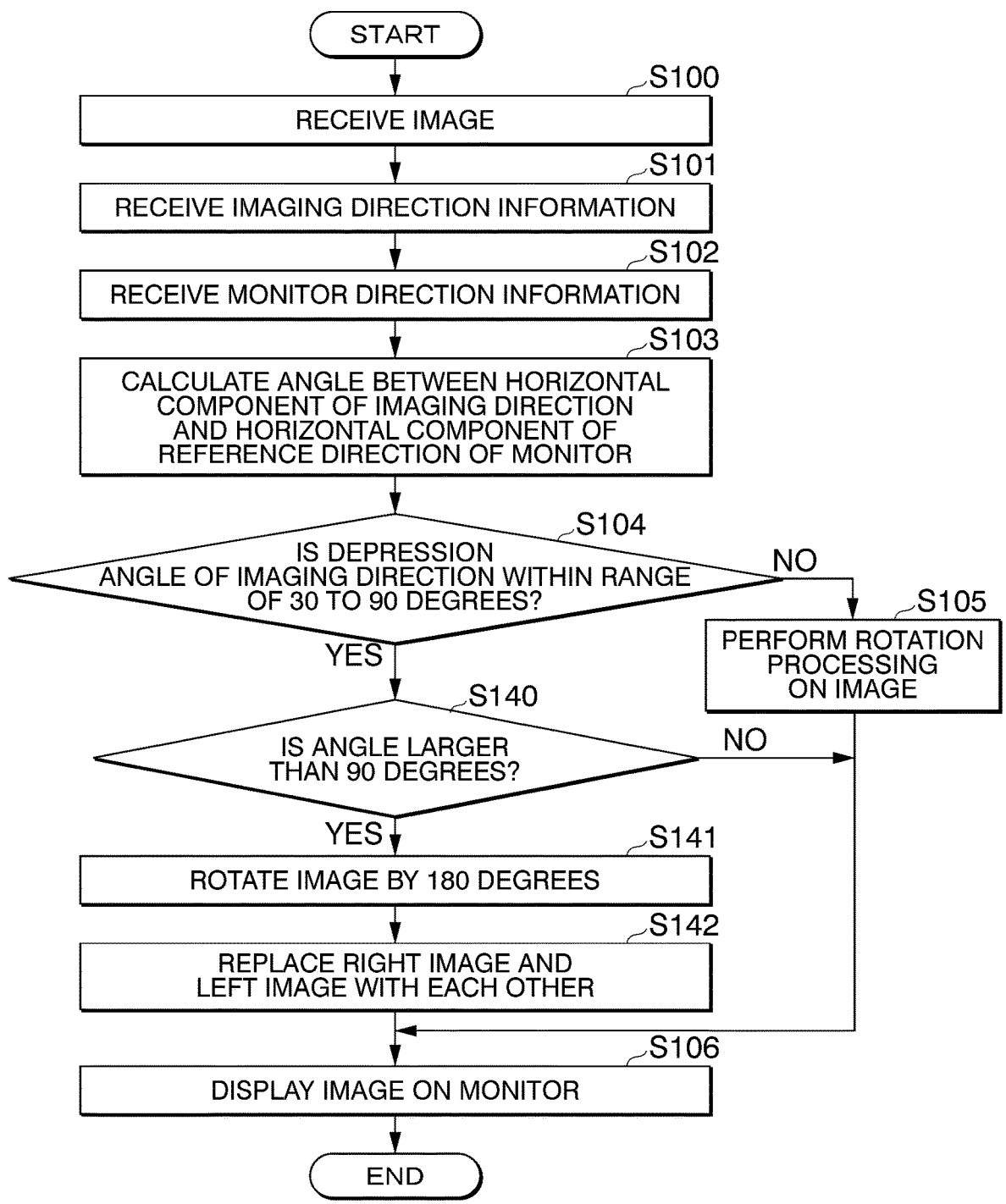
FIG. 36 is a flow chart showing a procedure of an operation of a processor unit in a seventh embodiment of the present disclosure.

An operation of the processor unit 6 will be described by using FIG. 36. FIG. 36 shows a procedure of the operation of the processor unit 6. Descriptions of the same processing as that shown in FIG. 9 will be omitted.

The processor 64 receives a left image and a right image output from the image sensor 22 in Step S100.

When the processor 64 determines that the depression angle of the imaging direction is within the range of 30 to 90 degrees in Step S104, the processor 64 determines whether the angle calculated in Step S103 is larger than 90 degrees (Step S140).

When the processor 64 determines that the angle calculated in Step S103 is 90 degrees or less, Step S106 is executed. When the processor 64 determines that the angle calculated in Step S103 is larger than 90 degrees, the processor 64 rotates the left image and the right image received in Step S100 by 180 degrees. By doing this, the processor 64 corrects the left image and the right image (Step S141).

After Step S141, the processor 64 replaces the left image and the right image with each other (Step S142). After Step S142, Step S106 is executed.

The order in which Step S141 and Step S142 are executed is not limited to that shown in FIG. 36. The processor 64 may replace the left image and the right image acquired by the imaging unit 21 with each other and then may perform the rotation processing on the left image and the right image.

Figure 37:
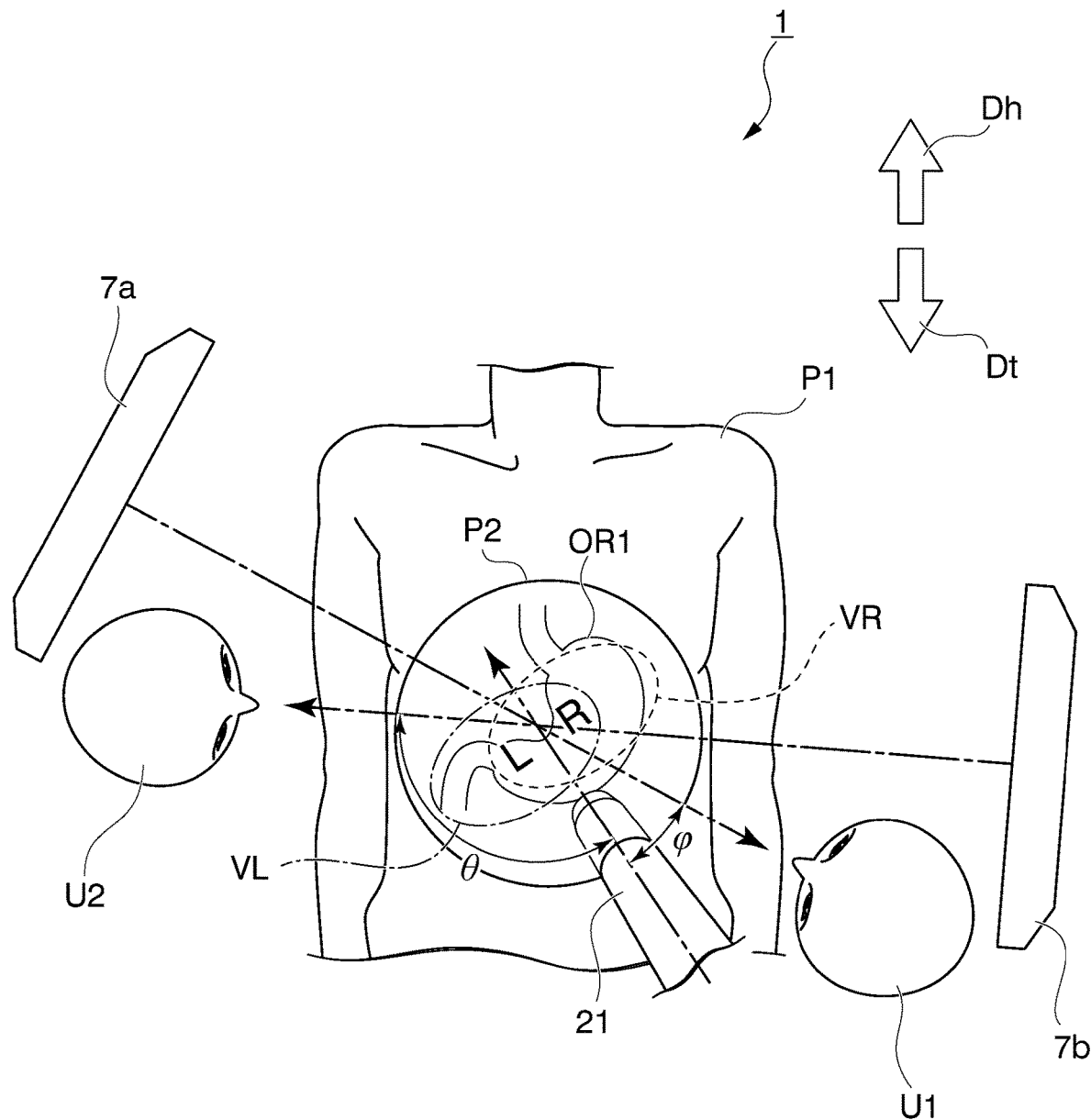
FIG. 37 is a schematic diagram showing a layout of an endoscope system according to the seventh embodiment of the present disclosure.

FIG. 37 schematically shows a layout of the endoscope system 1 in an operation room. Each configuration overlooked in a direction vertical to the ground is shown in FIG. 37. Descriptions of the same configuration as that shown in FIG. 2 will be omitted.

The monitor 7c, the scopist U3, the treatment tool T1, the treatment tool T2, the treatment tool T3, and the treatment tool T4 are not shown in FIG. 37. A region VL and a region VR are shown in FIG. 37. The region VL corresponds to a field of view of the left eye of an observer. The region VR corresponds to a field of view of the right eye of the observer. The region VL is relatively on the left side of the region VR.

The angle $\varphi$ shown in FIG. 37 is smaller than 90 degrees. Therefore, the processor 64 outputs a left image and a right image acquired by the imaging unit 21 to the monitor 7a without performing the rotation processing on the left image and the right image. The angle $\theta$ shown in FIG. 37 is larger than 90 degrees. Therefore, the processor 64 performs the rotation processing on the left image and the right image acquired by the imaging unit 21 and replaces the left image and the right image with each other. The processor 64 outputs the processed left and right images to the monitor 7b.

Figure 38:
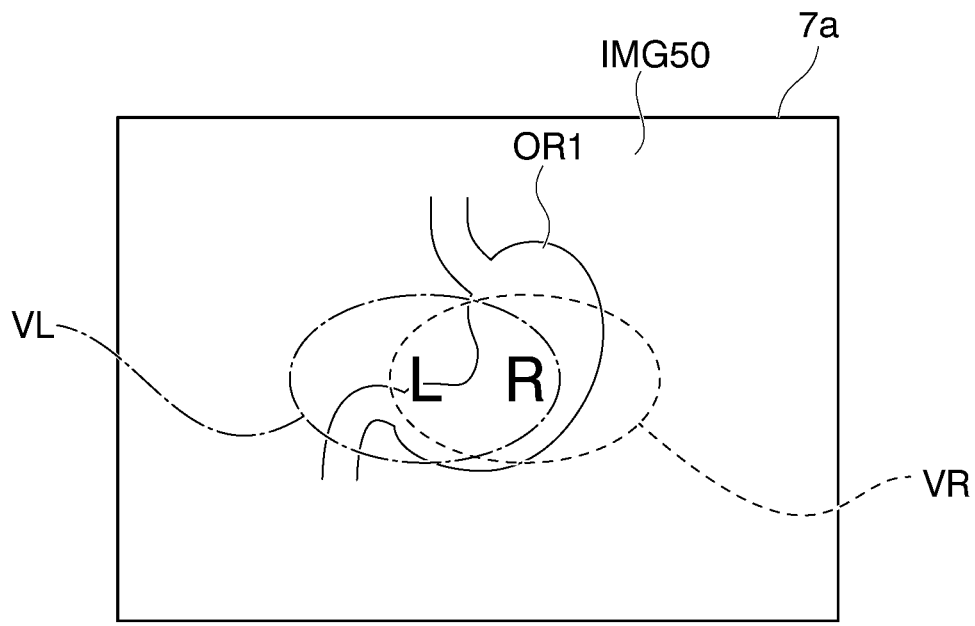
FIG. 38 is a diagram showing an example of an image displayed on a monitor in the seventh embodiment of the present disclosure.

FIG. 38 shows an example of an image displayed on the monitor 7a. The monitor 7a displays an image IMG50 acquired by the imaging unit 21. Actually, the image IMG50 includes a left image and a right image. The organ OR1 is seen in the image IMG50. A region VL corresponding to the region VL shown in FIG. 37 is shown in FIG. 38, and a region VR corresponding to the region VR shown in FIG. 37 is shown in FIG. 38. Since the rotation processing is not performed, the region VL is relatively on the left side of the region VR.

Figure 39:
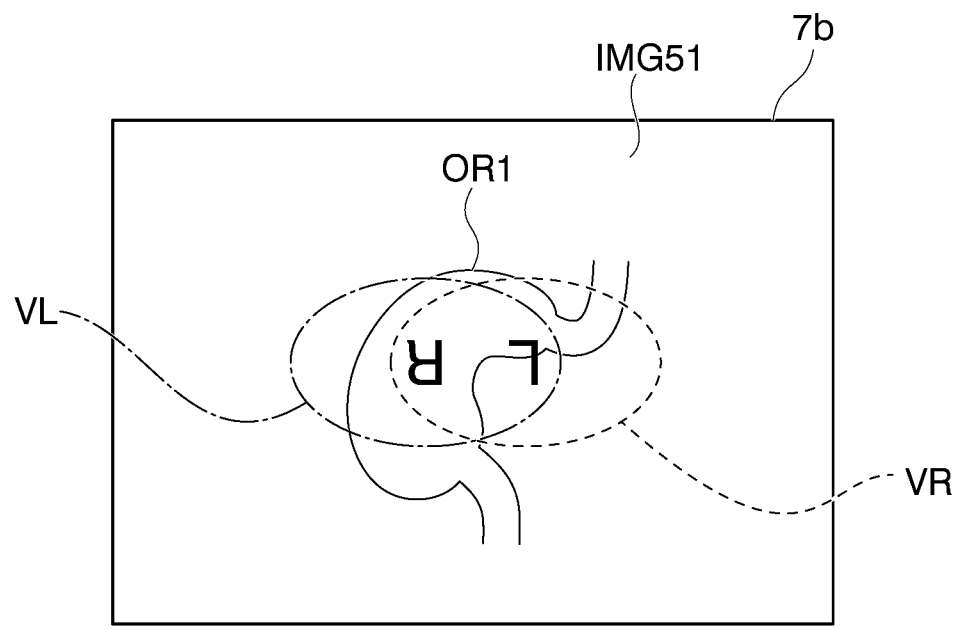
FIG. 39 is a diagram showing an example of an image displayed on the monitor in the seventh embodiment of the present disclosure.

FIG. 39 shows an example of an image displayed on the monitor 7b. The monitor 7b displays an image IMG51. Actually, the image IMG51 includes a left image and a right image. The processor 64 performs the rotation processing on the image IMG50 shown in FIG. 38 and replaces the left image and the right image with each other. By doing this, the processor 64 generates the image IMG51. A region VL corresponding to the region VL shown in FIG. 37 is shown in FIG. 39, and a region VR corresponding to the region VR shown in FIG. 37 is shown in FIG. 39. Since the rotation processing is performed, the direction of the organ OR1 is different from that of the organ OR1 shown in FIG. 38. Since the rotation processing is performed, the region VL is relatively on the left side of the region VR.

Figure 40:
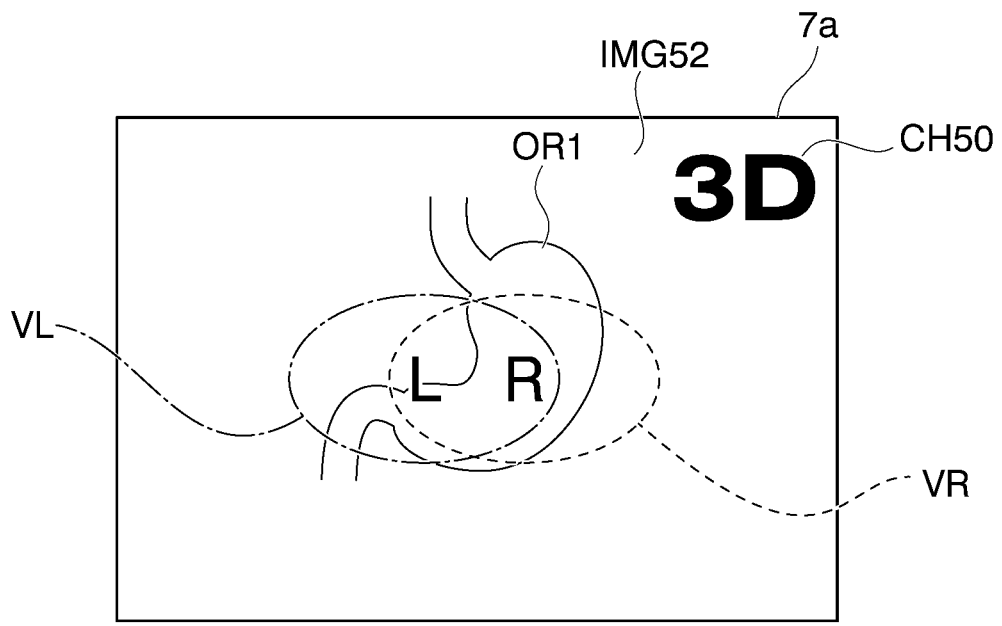
FIG. 40 is a diagram showing an example of an image displayed on the monitor in the seventh embodiment of the present disclosure.

FIG. 40 shows another example of an image displayed on the monitor 7a. The monitor 7a displays an image IMG52. Differences between the image IMG52 and the image IMG50 shown in FIG. 38 will be described. The processor 64 superimposes, on the image IMG52, information indicating whether the rotation processing has been performed on the image IMG52. In the example shown in FIG. 40, characters CH50 are displayed on the image IMG52. The characters CH50 indicate that the rotation processing has not been performed on the image IMG52. The operator U1 can recognize that the image IMG52 displayed on the monitor 7a has not rotated.

Figure 41:
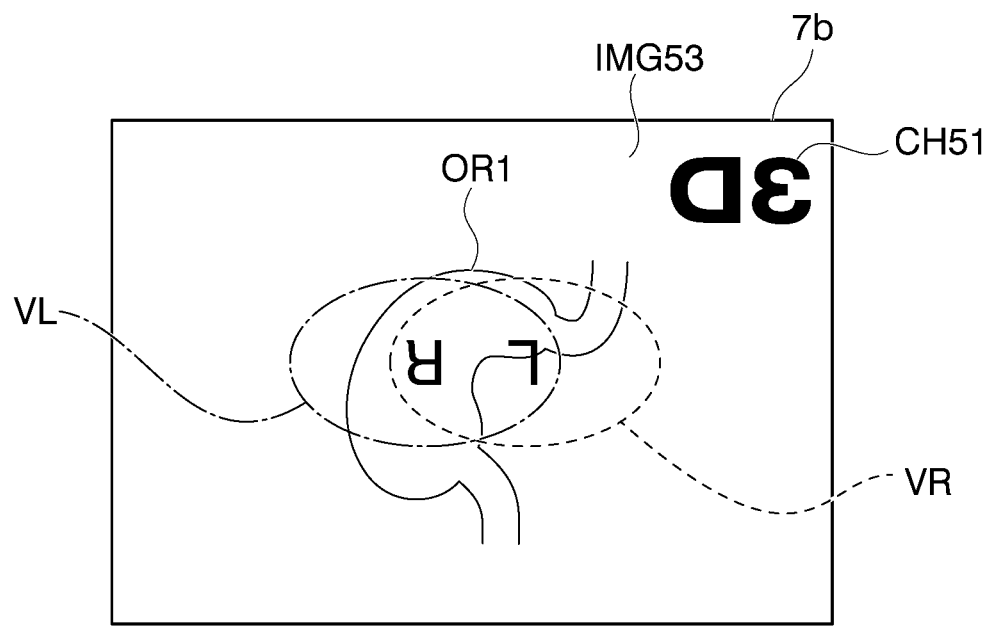
FIG. 41 is a diagram showing an example of an image displayed on the monitor in the seventh embodiment of the present disclosure.

FIG. 41 shows another example of an image displayed on the monitor 7b. The monitor 7b displays an image IMG53. Differences between the image IMG53 and the image IMG51 shown in FIG. 39 will be described. The processor 64 superimposes, on the image IMG53, information indicating whether the rotation processing has been performed on the image IMG53. In the example shown in FIG. 41, characters CH51 are displayed on the image IMG53. The characters CH51 indicate that the rotation processing has been performed on the image IMG53. The assistant U2 can recognize that the image IMG53 displayed on the monitor 7b has rotated.

The HMD 12a shown in FIG. 17 may be used instead of the monitor 7a, and the HMD 12b shown in FIG. 17 may be used instead of the monitor 7b.

In the seventh embodiment, the endoscope system 1 performs the rotation processing of an image in accordance with an angle between the imaging direction of the imaging unit 21 and the reference direction of the operator U1 (or the assistant U2) and replaces a left image and a right image with each other. By rotating the image by 180 degrees, the endoscope system 1 can maintain the display of a stereoscopic image. In addition, by replacing the left image and the right image with each other, the endoscope system 1 can perform the perspective correction. The operator U1 or the assistant U2 can intuitively manipulate each treatment tool.

Eighth Embodiment

An eighth embodiment of the present disclosure will be described. In the eighth embodiment, the endoscope system 1 shown in FIG. 7 is used. The endoscope system 1 displays a stereoscopic image. Hereinafter, an example in which the imaging unit 21 acquires an image of a subject seen in a direction close to the horizontal direction will be described.

The imaging unit 21 acquires a left image and a right image as an image of a subject. The image sensor 22 of the imaging unit 21 generates the left image and the right image. The processor 64 performs the horizontal flip processing on the left image and the right image. The processor 64 performs processing of replacing the left image and the right image with each other. The processor 64 treats the left image on which the horizontal flip processing has been performed as a right image. In addition, the processor 64 treats the right image on which the horizontal flip processing has been performed as a left image.

Figure 42:
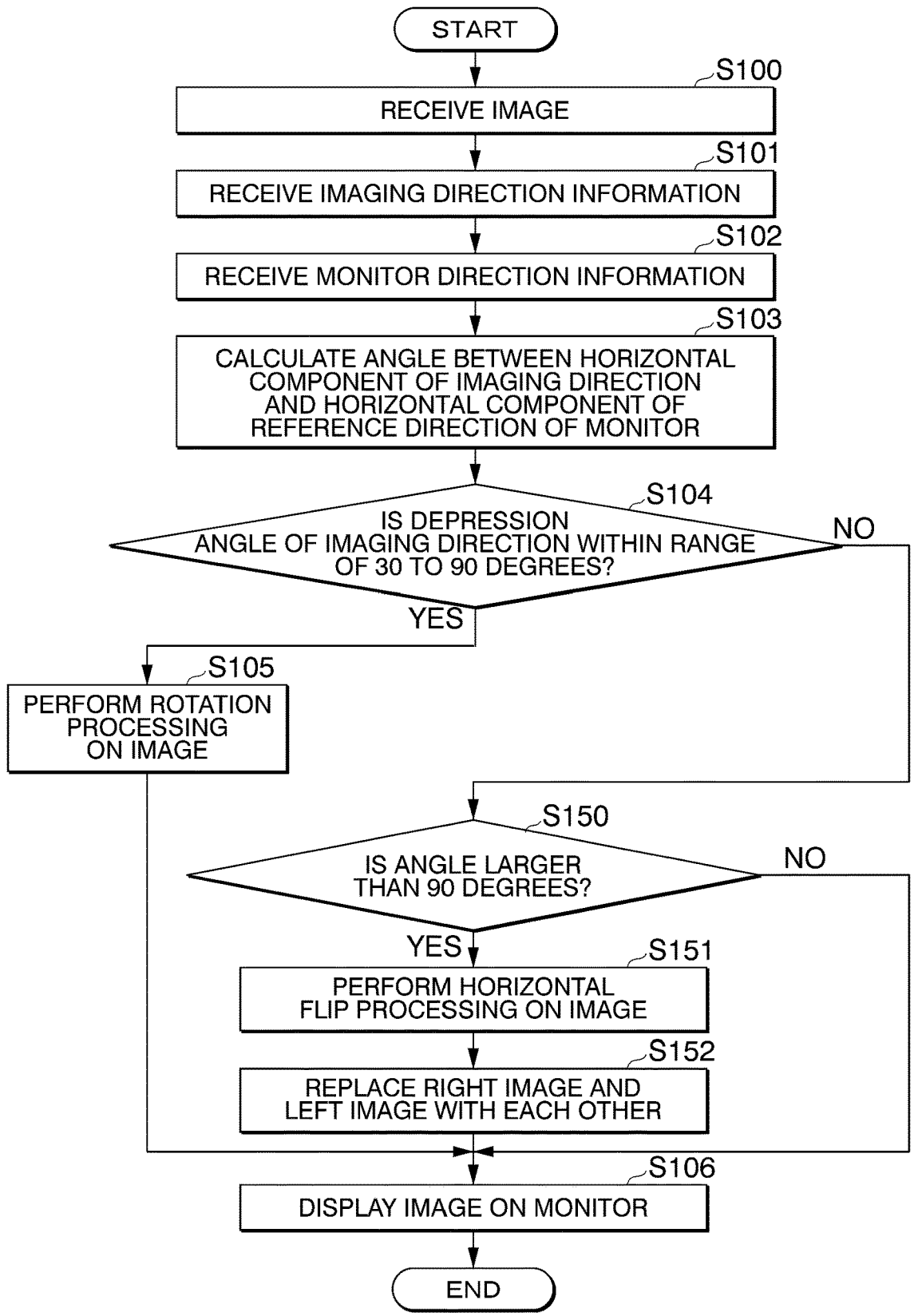
FIG. 42 is a flow chart showing a procedure of an operation of a processor unit in an eighth embodiment of the present disclosure.

An operation of the processor unit 6 will be described by using FIG. 42. FIG. 42 shows a procedure of the operation of the processor unit 6. Descriptions of the same processing as that shown in FIG. 9 will be omitted.

The processor 64 receives a left image and a right image output from the image sensor 22 in Step S100.

When the processor 64 determines that the depression angle of the imaging direction is within the range of 30 to 90 degrees in Step S104, the processor 64 determines whether the angle calculated in Step S103 is larger than 90 degrees (Step S150).

When the processor 64 determines that the angle calculated in Step S103 is 90 degrees or less, Step S106 is executed. When the processor 64 determines that the angle calculated in Step S103 is larger than 90 degrees, the processor 64 performs the horizontal flip processing on the left image and the right image received in Step S100. By doing this, the processor 64 corrects the left image and the right image (Step S151).

After Step S151, the processor 64 replaces the left image and the right image with each other (Step S152). After Step S152, Step S106 is executed.

The order in which Step S151 and Step S152 are executed is not limited to that shown in FIG. 42. The processor 64 may replace the left image and the right image acquired by the imaging unit 21 with each other and then may perform the horizontal flip processing on the left image and the right image.

When the depression angle of the imaging direction is 30 degrees or more and 90 degrees or less, Steps S140 to S142 and Step S106 shown in FIG. 36 may be executed.

Figure 43:
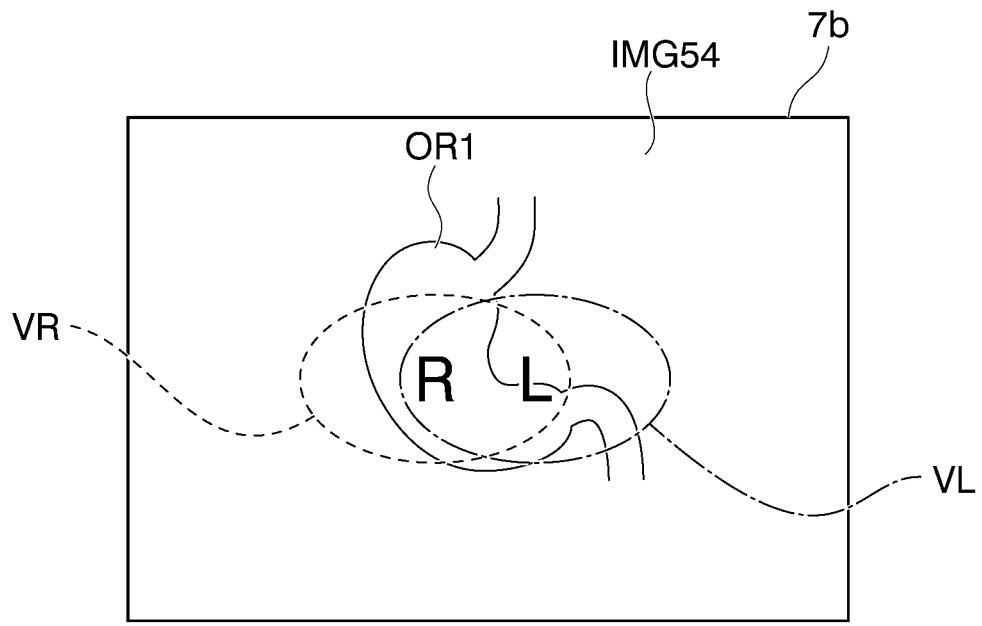
FIG. 43 is a diagram showing an example of an image displayed on a monitor in the eighth embodiment of the present disclosure.

For example, the monitor 7c displays the image IMG50 shown in FIG. 38. FIG. 43 shows an example of an image displayed on the monitor 7b. The monitor 7b displays an image IMG54. Actually, the image IMG54 includes a left image and a right image. The processor 64 performs the horizontal flip processing on the image IMG50 shown in FIG. 38 and replaces the left image and the right image with each other. By doing this, the processor 64 generates the image IMG54. A region VL corresponding to the region VL shown in FIG. 37 is shown in FIG. 43, and a region VR corresponding to the region VR shown in FIG. 37 is shown in FIG. 43. Since the horizontal flip processing is performed, the organ OR1 has been horizontally flipped. Since the horizontal flip processing is performed, the region VR is relatively on the left side of the region VL.

Figure 44:
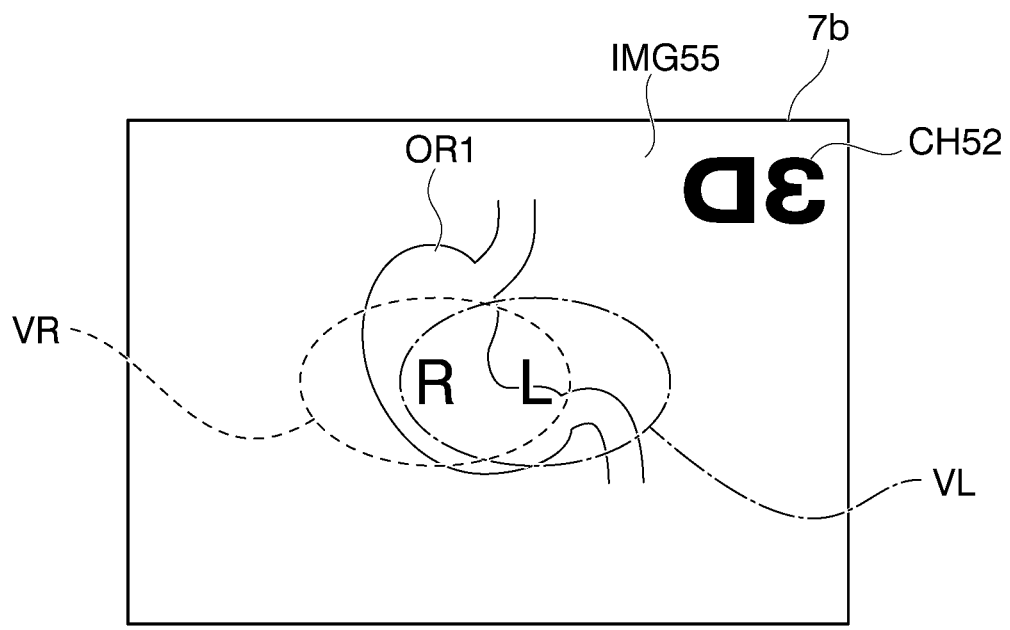
FIG. 44 is a diagram showing an example of an image displayed on the monitor in the eighth embodiment of the present disclosure.

FIG. 44 shows another example of an image displayed on the monitor 7b. The monitor 7b displays an image IMG55. Differences between the image IMG55 and the image IMG54 shown in FIG. 43 will be described. The processor 64 superimposes, on the image IMG55, information indicating whether the horizontal flip processing has been performed on the image IMG55. In the example shown in FIG. 44, characters CH52 are displayed on the image IMG55. The characters CH52 indicate that the horizontal flip processing has been performed on the image IMG55. The assistant U2 can recognize that the image IMG55 displayed on the monitor 7b has been horizontally flipped.

The HMD 12a shown in FIG. 17 may be used instead of the monitor 7a, and the HMD 12b shown in FIG. 17 may be used instead of the monitor 7b.

In the eighth embodiment, the endoscope system 1 performs the horizontal flip processing of an image in accordance with an angle between the imaging direction of the imaging unit 21 and the reference direction of the operator U1 (or the assistant U2) and replaces a left image and a right image with each other. By performing the horizontal flip processing, the endoscope system 1 can maintain the display of a stereoscopic image. In addition, by replacing the left image and the right image with each other, the endoscope system 1 can perform the perspective correction. Due to this, the vertical direction in an image displayed on the monitor 7a or the monitor 7b almost matches the actual vertical direction, the left-and-right direction in the image almost matches the actual left-and-right direction, and the far-and-near direction in the image almost matches the actual far-and-near direction. Therefore, the operator U1 or the assistant U2 can intuitively manipulate each treatment tool.

While some embodiments of the disclosure have been described and shown above, it should be understood that these are examples of the disclosure and are not to be considered as limiting. Additions, omissions, substitutions, and other modifications can be made without departing from the spirit or scope of the present disclosure. Accordingly, the disclosure is not to be considered as being limited by the foregoing description, and is only limited by the scope of the appended claims.

REFERENCE SIGNS LIST 1, 1a, 1b endoscope system
2, 2b endoscope insertion unit
3 universal code
4 manipulation unit
5 connector unit
6, 6b processor unit
7, 7a, 7b, 7c monitor
8 scope
10, 11, 23 azimuth sensor
12a, 12b HMD
20 insertion unit
21, 21b imaging unit
22 image sensor
60 image communication unit
61, 62, 63 sensor communication unit
64 processor

What is claimed is:

1. An endoscope system, comprising:
an endoscope configured to acquire an image of a subject;
at least one monitor;
a first measuring instrument configured to measure a first direction, wherein the first direction corresponds to a horizontal component of an imaging direction of the endoscope;
at least one second measuring instrument configured to measure a second direction, wherein the second direction corresponds to a horizontal component of a reference direction, where the reference direction is a direction in which the at least one monitor faces or is a direction toward or away from an image display surface of the at least one monitor;
a reception circuit configured to receive the image from the endoscope; and
a sensor that measures a depression angle between the imaging direction and a horizontal plane,
a processor; and
wherein the processor is configured to:
calculate an angle between the first direction and the second direction,
process the image based on the angle and the depression angle, wherein the processing includes a rotation processing or a horizontal flip processing, and
display the processed image on the at least one monitor.

2. The endoscope system according to claim 1, wherein the second measuring instrument is disposed on the monitor, and
wherein the reference direction is the direction in which the at least one monitor faces.

3. The endoscope system according to claim 1, wherein the second measuring instrument is disposed on a body of the user, and
wherein the reference direction is the direction toward the image display surface of the at least one monitor.

4. The endoscope system according to claim 1, further comprising a treatment tool,
wherein a third direction corresponds to a horizontal component of a reference direction of the treatment tool, and
wherein the at least one second measuring instrument is further configured to measure the third direction by using an image that contains the treatment tool.

5. The endoscope system according to claim 1, wherein the second measuring instrument measures the second direction using an image that contains the at least one monitor.

6. The endoscope system according to claim 1, wherein the processor displays a value of the angle on the monitor.

7. The endoscope system according to claim 1, wherein the processor displays an icon on the monitor, where the icon has an orientation that corresponds to the angle.

8. The endoscope system according to claim 1, wherein the endoscope acquires the image at a predetermined frame rate, and
wherein the processor calculates the angle at a lower rate than the frame rate.

9. The endoscope system according to claim 1, wherein the processor corrects distortion of the image, which is generated in accordance with a distance between the endoscope and a subject, by using the depression angle.

10. The endoscope system according to claim 1, wherein the endoscope includes an image sensor in which a plurality of pixels are disposed in a matrix shape, and
wherein an effective vertical pixel number of the image sensor is greater than a vertical pixel number of the image displayed on the at least one monitor.

11. The endoscope system according to claim 1, wherein, when the depression angle is larger than a preset angle, the processor performs the rotation processing on the image based on the angle.

12. The endoscope system according to claim 1, wherein, when the depression angle is smaller than a preset first angle and the angle between the first direction and the second direction is larger than a preset second angle, the processor performs the horizontal flip processing on the image.

13. The endoscope system according to claim 1, wherein the image of the subject includes a left image and a right image used for displaying a stereoscopic image, and wherein the processing includes replacing the left image and the right image with each other.

14. A processor unit, comprising:

a reception circuit connected using a wireless or a wired connection to an endoscope, wherein the endoscope acquires an image of a subject in a living body and the reception circuit receives the image from the endoscope; and a processor, wherein the processor:

calculates an angle between a first direction and a second direction, where the first direction corresponds to a horizontal component of an imaging direction of the endoscope and the second direction corresponds to a horizontal component of a reference direction, where the reference direction is a direction in which a monitor faces or is a direction in which a user faces a monitor, processes the image based on the angle and a depression angle between the imaging direction and a horizontal plane, wherein the processing includes a rotation processing or a horizontal flip processing and the depression angle is measured by a sensor, and displays the processed image on the monitor.

15. An image rotation method performed by a processor, the image rotation method comprising:

calculating an angle between a first direction and a second direction, wherein the first direction corresponds to a horizontal component of an imaging direction of an endoscope and the second direction corresponds to a horizontal component of a reference direction, where the reference direction is a direction in which a monitor faces or is a direction in which a user faces a monitor;

processing an image acquired by the endoscope based on the angle and a depression angle between the imaging direction and a horizontal plane, wherein the processing includes rotation processing or horizontal flip processing and the depression angle is measured by a sensor; and displaying the processed image on the monitor.

* * * * *